(12) United States Patent
Venkataraman et al.

(10) Patent No.: US 11,599,887 B2
(45) Date of Patent: Mar. 7, 2023

(54) ANALYZING TELEMETRY DATA TO TRACK PROGRESS THROUGH AN EXPERIENCE LIFECYCLE AND PROVIDE INTELLIGENT LIFECYCLE-BASED INFORMATION FOR COMPUTING SOLUTIONS

(71) Applicant: Cisco Technology, Inc., San Jose, CA (US)

(72) Inventors: Vasudha Venkataraman, Sunnyvale, CA (US); Joshua David Suhr, Lenexa, KS (US); Jonathan Sturgis Leary, Brookline, MA (US); Ramit Kanda, Danville, CA (US)

(73) Assignee: Cisco Technology, Inc., San Jose, CA (US)

( * ) Notice: Subject to any disclaimer, the term of this patent is extended or adjusted under 35 U.S.C. 154(b) by 434 days.

(21) Appl. No.: 16/821,878

(22) Filed: Mar. 17, 2020

(65) Prior Publication Data

US 2021/0295346 A1 Sep. 23, 2021

(51) Int. Cl.
*G06F 9/44* (2018.01)
*G06Q 30/016* (2023.01)
(Continued)

(52) U.S. Cl.
CPC .......... *G06Q 30/016* (2013.01); *G06F 9/453* (2018.02); *G06F 11/3438* (2013.01); *G09B 19/0053* (2013.01); *H04L 67/306* (2013.01)

(58) Field of Classification Search
None
See application file for complete search history.

(56) References Cited

U.S. PATENT DOCUMENTS 8,060,223 B2 * 11/2011 Chand .................. G05B 19/056
700/87
8,677,317 B2 * 3/2014 Arnold ..................... G06F 8/61
717/109

(Continued)

OTHER PUBLICATIONS

Ries, "Lean UX", retrieved from the internet on Dec. 6, 2019 at <<https://www.scaledagileframework.com/lean-ux/>>, 5 pages.

(Continued)

*Primary Examiner* — Anna C Deng
(74) *Attorney, Agent, or Firm* — Lee & Hayes, P.C.

(57) ABSTRACT

Techniques for collecting telemetry data, indicating usage of a computing-based solution hosted in a computing resource network, to ascertain a stage of progression through an experience lifecycle for the computing-based solution, and to generate data for populating lifecycle templates with content for progressing from the stage to which the user account has progressed to the next stage of the experience lifecycle, to include on a user interface for display on a computing device associated with a user account. A software agent executing on a node in the computing resource network may collect the telemetry data to provide to a Software-Defined Networking (SDN) controller disposed in the same network. The SDN controller may transmit the telemetry data to a service provider network, where the data is utilized to determine lifecycle data for generating a user portal to present on the computing device associated with the user account.

20 Claims, 10 Drawing Sheets

(51) Int. Cl.
*G06F 9/451* (2018.01)
*H04L 67/306* (2022.01)
*G06F 11/34* (2006.01)
*G09B 19/00* (2006.01)

(56) References Cited

U.S. PATENT DOCUMENTS

| | | | |
|---|---|---|---|
| 9,461,935 B2* | 10/2016 | Mohindra | H04L 47/803 |
| 9,507,583 B2* | 11/2016 | Kurian | H04L 41/082 |
| 9,760,912 B2 | 9/2017 | Kruglick | |
| 9,967,154 B2 | 5/2018 | Masterson et al. | |
| 10,409,589 B2* | 9/2019 | Rihani | G06F 9/45558 |
| 10,484,255 B2 | 11/2019 | Di Pietro et al. | |
| 11,372,639 B2* | 6/2022 | Gungabeesoon | G06F 11/3688 |
| 2011/0161915 A1* | 6/2011 | Srinivasamoorthy | G06F 8/36 |
| | | | 717/174 |

OTHER PUBLICATIONS

"Monitoring and Diagnostics Tools in Lifecycle Services (LCS)", retrieved from the internet on Dec. 6, 2019 at <<https://docs.microsoft.com/en-us/dynamics365/fin-ops-core/dev-itpro/lifecycle-servcies/monitoring-diagnostics#access-the-monitoring-and-diagnostics>>, 6 pages.

* cited by examiner

300

PROVIDER SOLUTION – WIRELESS ASSURANCE USE CASE 302

ONBOARD 304(A)

| STEPS 306(A) | MEASUREMENT 308(A) | SUCCESS THRESHOLD 310(A) |
|---|---|---|
| COMPLETE YOUR PROVIDER SDN SERVICE INSTALLATION | ACTIVATION PING FROM PROVIDER SDN (PSDN) SERVICE APPLIANCE TO PSDN CLOUD ['FIRST TIME CONNECT' TIMESTAMP] | NOT NULL |
| | PROVIDER SDN SERVICE VERSION (LATEST, -1) | LATEST / LATEST -1 |
| PLAN YOUR PROVIDER SDN SERVICE PROJECT | USER HAS ATTENDED PROJECT PLANNING AND GETTING STARTED ATX OR USER HAS CLICKED ON DOCUMENT / LINK FOR PROJECT PLANNING OR DEPLOYMENT PLANNING | NOT NULL |

IMPLEMENT 304(B)

| STEPS 306(B) | MEASUREMENT 308(B) | SUCCESS THRESHOLD 310(B) |
|---|---|---|
| DISCOVER YOUR NETWORK WITH PROVIDER SDN SERVICE | NETWORK DISCOVERY JOB AND | $\geq 1$ COMPLETED |
| | WIRELESS LAN CONTROLLER, LAST SYNC STATUS = MANAGED AND | $\geq 1$ |
| | ACCESS POINT (AP), LAST SYNC STATUS = MANAGED | $\geq 1$ |
| BUILD YOUR NETWORK & SITE HIERARCHY | SITE CREATED (OTHER THAN GLOBAL) | $\geq 1$ |
| ASSURANCE SET UP | COMPLETE YOUR WIRELESS ASSURANCE SETUP | $\geq 1$ |
| SCALE YOUR ENDPOINT DEPLOYMENT | TOTAL CLIENT DEVICE COUNT – ALL SITES | $\geq 250$ |

USE 304(C)

| STEPS 306(C) | MEASUREMENT 308(C) | SUCCESS THRESHOLD 310(C) |
|---|---|---|
| MONITOR HEALTH OF THE NETWORK | OVERALL HEALTH AND NETWORK HEALTH AND CLIENT HEALTH AND DEVICE 360 AND CLIENT 360 | $\geq 1$ PAGE VIEW WEEKLY |
| SCALE THE NETWORK INFRASTRUCTURE | LICENSED APS MANAGED, ASSIGNED TO SITE | $\geq 10\%$ |
| VIEW ISSUES DETECTED BY ASSURANCE | NUMBER OF ISSUES VIEWED | $\geq 1$ ISSUE VIEWED WEEKLY |

ENGAGE 304(D)

| STEPS 306(D) | MEASUREMENT 308(D) | SUCCESS THRESHOLD 310(D) |
|---|---|---|
| SCALE YOUR NETWORK INFRASTRUCTURE | LICENSED APS MANAGED, ASSIGNED TO THE SITE | $\geq 80\%$ |
| NETWORK TIME TRAVEL FOR FORENSIC INVESTIGATION | TIME TRAVEL IN 360 VIEWS (CLIENT, NETWORK, NETWORK HEALTH, AND ISSUES) | $\geq 4$ MONTHLY |
| VIEW AND CUSTOMIZE ISSUES DETECTED BY ASSURANCE | NUMBER OF ISSUES VIEWED (360 OR GLOBAL) AND SUGGESTED ACTIONS CLICKED AND ISSUES CUSTOMIZED | $\geq 5$ MONTHLY |
| USE ADVANCE TROUBLESHOOTING ASSURANCE TOOLS | IC PACKAGE INSTALLED AND CAPTURES CONFIGURED / VIEWED PER MONTH | STATUS = DEPLOYED AND $\geq 1$ CAPTURES CONFIGURED |
| | SENSOR PACKAGE INSTALLED AND TESTS CREATED / VIEWED PER MONTH | STATUS = DEPLOYED AND $\geq 1$ TEST CREATED |

ADOPT 304(E)

| STEPS 306(E) | MEASUREMENT 308(E) | SUCCESS THRESHOLD 310(E) |
|---|---|---|
| SCALE THE NETWORK INFRASTRUCTURE | LICENSED APS MANAGED, ASSIGNED TO THE SITE | $\geq 95\%$ |
| CONFIGURE PROVIDER SDN SERVICE SYSTEM BACKUPS | SYSTEM BACKUP SCHEDULED AND SYSTEM BACKUPS SUCCESSFULLY COMPLETED | SCHEDULED / COMPLETED |
| ADD YOUR MANAGEMENT USERS TO PROVIDER SDN SERVICE BASED ON THEIR ROLE | NUMBER OF USERS OTHER THAN ADMIN | $\geq 1$ |
| CHANGE STATUS ON AN ISSUE DETECTED BY ASSURANCE | ISSUE STATUS | $\geq=1$ ISSUES STATUS CHANGED – RESOLVED / IGNORE |

OPTIMIZE 304(F)

| STEPS 306(F) | MEASUREMENT 308(F) | SUCCESS THRESHOLD 310(F) |
|---|---|---|
| PROVIDER SDN SERVICE VERSION | VERSION OF SOFTWARE RUNNING ON PROVIDER SDN SERVICE | LATEST |

FIG. 3

ANALYZING TELEMETRY DATA TO TRACK PROGRESS THROUGH AN EXPERIENCE LIFECYCLE AND PROVIDE INTELLIGENT LIFECYCLE-BASED INFORMATION FOR COMPUTING SOLUTIONS

TECHNICAL FIELD

The present disclosure relates generally to collecting telemetry data associated with computing solution to track a user's progress through an experience lifecycle and provide intelligent life-cycle based information for presentation on a user interface associated with computing solution(s).

BACKGROUND

Service providers offer computing-based services, or solutions, to provide users with access to computing resources to fulfill users' computing resource needs without having to invest in and maintain computing infrastructure required to implement the services. These service providers often maintain networks of data centers which house servers, routers, and other devices that provide computing resources to users such as compute resources, networking resources, storage resources, database resources, application resources, and so forth. The solutions offered by service providers may include a wide range of services that may be fine-tuned to meet a user's needs. Users may be allocated portions of computing resources across a number of networks using virtualization technology to support such solutions. Additionally, these solutions may be driven by a number of underlying set of technologies that may become complex to a user when utilized together to support a desired solution.

To utilize these solutions, a user may be required to deploy and manipulate a complex set of underlying technologies in a specific manner required by the solution. These technologies and how they are utilized together may vastly differ depending on the solution utilized by a user and the goal a user desires to achieve with the solution. For example, a solution may require communication between, and utilization of, multiple systems in differing fields of expertise, thus requiring a user to be well versed in a variety of fields to properly implement, utilize, and maintain the desired solution.

Service providers may offer a number of resources to familiarize a user with technologies required to maintain a solution, such as a solution setup guide or a tutorial. However, users lacking the technical knowledge required to effectively navigate a tutorial for the solution may require assistance from an expert in the field. Many service providers may offer support content to users to help them understand and use their solutions, such as webinars, support documents, ask-an-expert services, and/or customer support. This support content often leaves users advancing through stages of progression without understanding the actions they are taking, and while support content such as 24-hour customer support may be helpful to obtain answers to frequently asked questions, this support content is generally not tailored to the current issues a user is faced with. Thus, a user must ascertain what issue they are experiencing, how far along in implementation and/or utilization stages they have progressed, and what actions they have taken in the current stage of progression, ultimately resulting in a poor user experience and underutilization of the solutions provided by the service provider.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3 illustrates an example overview of an experience lifecycle for a computing-based solution offered by a service provider.

DESCRIPTION OF EXAMPLE EMBODIMENTS

Overview

Figure 1:
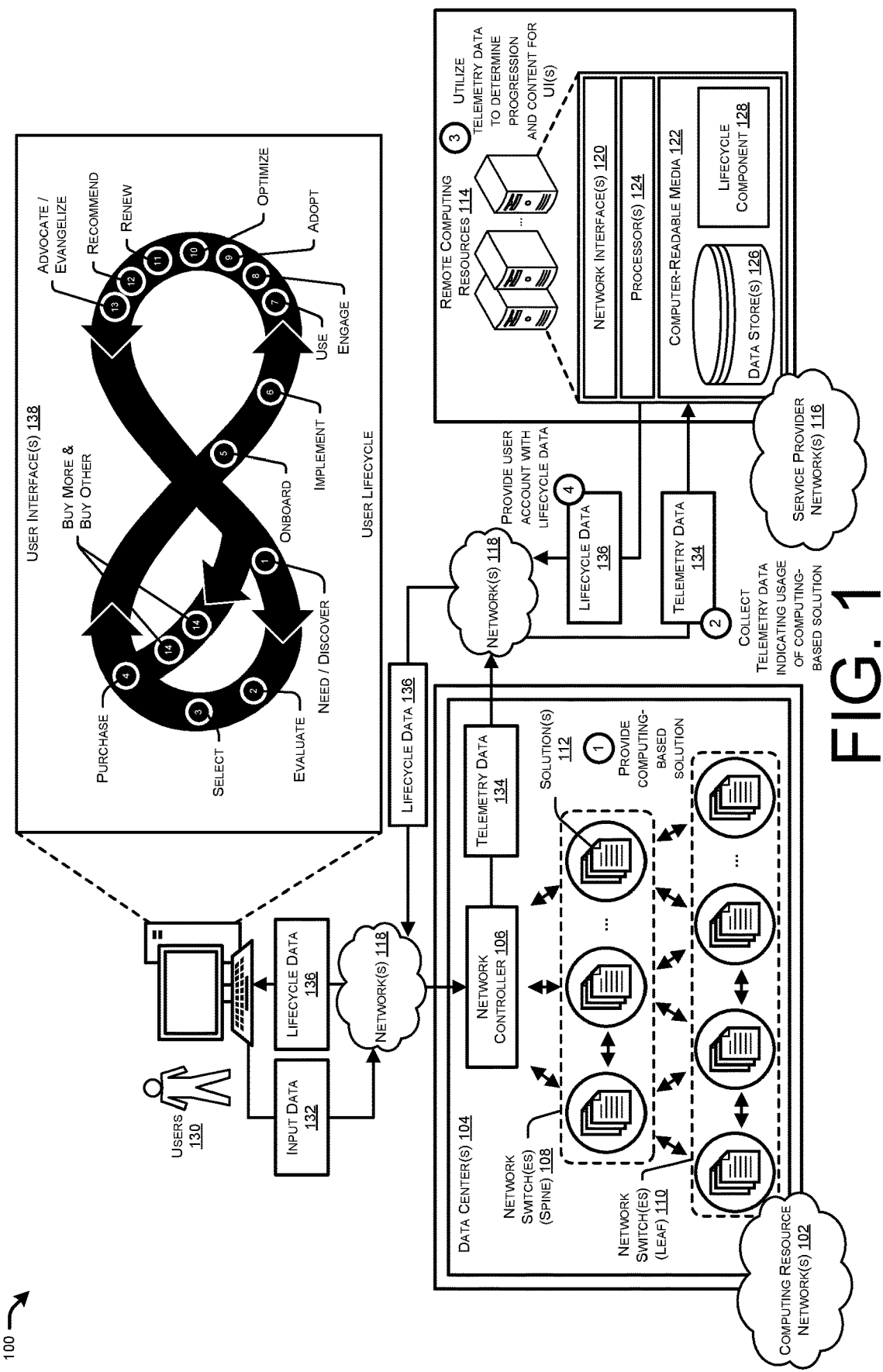
FIG. 1 illustrates a system-architecture diagram of an example flow for collecting telemetry data indicating usage of a computing-based solution hosted in a computing resource network to ascertain a stage of progression through an experience lifecycle for the computing-based solution, and to generate data for populating lifecycle templates, with content for progressing from the stage to the next stage of the experience lifecycle, to include on a user interface for display on a computing device associated with a user account.

This disclosure describes a method of collecting telemetry data, indicating usage of a computing-based solution hosted in a computing resource network, to ascertain a stage of progression through an experience lifecycle for the computing-based solution, and to generate data for populating lifecycle templates with content for progressing from the stage to which the user account has progressed to the next stage of the experience lifecycle, to include on a user interface for display on a computing device associated with a user account. The method includes providing a computing-based solution to a user account associated with a service provider. The computing-based solution may be deployed on one or more computing devices associated with the user account. The method may further include collecting telemetry data indicative of usage of the computing-based solution by the one or more computing devices. The method may further include using the telemetry data to determine a first stage, from a plurality of stages, of an experience lifecycle for the computing-based solution to which the user account has progressed. The method may further include identifying an association between the first stage of the experience lifecycle and content that includes information for progressing to a second stage of the plurality of stages in the experience lifecycle. The method may further include providing the user account with access to indications of the first stage to which the user account has progressed in the experience lifecycle for the computing-based solution, and the content that includes the information for progressing from the first stage to the second stage in the experience lifecycle.

Additionally, or alternatively, the method includes receiving usage data associated with usage of a computing-based solution provided to a user account associated with a service provider. The usage data may be indicative of a progression of the user account through stages of an experience lifecycle for the computing-based solution. The method may further include identifying, using the usage data, information to include in one or more user interfaces (UIs) for display on a computing device associated with the user account. The method may further include sending UI data representing the one or more UIs to the computing device. The one or more UIs may comprise a first portion in which a description of the computing-based solution is presented. Additionally, or alternatively, the one or more UIs may comprise a second portion in which a completion metric is presented. The completion metric may indicate a first stage to which the user account has progressed in the stages of the experience lifecycle. Additionally, or alternatively, a third portion in which an indication of supplemental content is presented. The supplemental content may comprise supplemental information for progressing from the first stage to a second stage in the experience lifecycle.

Additionally, or alternatively, the method includes providing a computing-based solution to a user account associated with a service provider. The computing-based solution may be deployed on one or more computing devices associated with the user account. The method may further include collecting usage data indicative of usage of the computing-based solution by the one or more computing devices. The method may further include using the usage data to determine a first stage, from a plurality of stages, of an experience lifecycle for the computing-based solution to which the user account has progressed. The method may further include identifying, using the usage data, information for progressing to a second stage of the plurality of stages in the experience lifecycle. The method may further include identifying an association between the first stage of the experience lifecycle and content to include in one or more user interfaces (UIs) for display on a computing device associated with the user account, the content including the information. The method may further include sending UI data representing the one or more UIs to the computing device. The one or more UIs may comprise a first portion in which a description of the computing-based solution is presented. Additionally, or alternatively, the one or more UIs may comprise a second portion in which a completion metric is presented. The completion metric may indicate the first stage of the stages in the experience lifecycle.

Additionally, the techniques described herein may be performed by a system and/or device having non-transitory computer-readable media storing computer-executable instructions that, when executed by one or more processors, performs the method described above.

Example Embodiments

The usefulness of server virtualization, from virtual machines to containers to storage, has resulted in a rapid increase in cloud computing and data centers. Using virtualization technologies, service providers can offer various computing-based services, or solutions to users with different computing resource needs, such as, for example, analytics and automation, artificial intelligence, intent-based networking, network architecture, software-defined networking, security, and the like. While a user may not have to invest in and maintain the computing infrastructure required to implement the solutions, a user may be required to deploy and manipulate complex underlying technologies required by a solution. The complex nature and implementation of these technologies may be intimidating to a user who desires to utilize a solution. Even a user who is well-versed in one area of technology may find it difficult to properly implement, utilize, and maintain a desired solution throughout its lifecycle.

Service providers offering such solutions may supply the user with content to familiarize a user with the underlying technologies required to support a solution. For example, a service provider offering a solution may include content to help a user set the solution up, such as a solution setup guide or a tutorial. Additionally, service providers may offer supplemental content to further assist a user who may be struggling to implement and/or utilize a solution. For example, a user working through a setup guide or a tutorial may be unsure if they have completed a stage in the setup or confused on how to proceed through a stage in the setup. The service provider may offer supplemental content to the user, such as, webinars, ask-an-expert services, and/or customer support. While this supplemental content may be effective in helping a user complete the current stage of progression through the lifecycle of a solution, this supplemental content often leaves users advancing without understanding the actions they are taking.

Even utilizing the provided supplemental content may prove difficult for some users as it is generally not tailored to the current stage and/or current issues a user is faced with. Thus, a user must ascertain what issue they are experiencing, how far along in the lifecycle of the solution to which they have progressed, and what actions they have taken in the current stage of progression. Some stages in the lifecycle of a solution require more action than others, and without access to data monitoring such solutions, it may be difficult to determine how far in a stage and/or a solution lifecycle the user has progressed. Accordingly, these difficulties may result in a poor user experience, underutilization of the solutions provided by a service provider, and even abandonment of the solution all together.

This disclosure describes techniques for collecting telemetry data indicating usage of a computing-based solution by one or more computing devices of a computing resource network to ascertain a stage of progression through an experience lifecycle for the computing-based solution, and to generate data for populating lifecycle templates, with content for progressing from the stage to the next stage of the experience lifecycle, to include on a user interface for display on a computing device associated with a user account. Additionally, the user interface may include one or more completion metrics associated with the user's progression through the experience lifecycle. The telemetry data may be operational data associated with the solution, and/or usage data associated with the solution. Further, the telemetry data may include indications of the progression of the user through the experience lifecycle of the computing-based solution. The techniques described herein include utilizing the telemetry data to provide a user with content that includes information for progressing from a stage of an experience lifecycle to which a user account has progressed, to the next stage in the experience lifecycle.

Generally, physical servers in a cloud computing network may execute software agents that collect the telemetry data indicating usage of the computing-based solutions by one or more computing devices of the network. In some examples, the agent may be running on a node, such as a network switch where the computing-based solution is connected, within a computing resource network. The software agents may periodically collect telemetry data throughout the lifecycle of the computing-based solution to track the progression of the user account through the experience lifecycle of the computing-based solution. In some examples, a Software-Defined-Networking (SDN) controller may be in communication with the software agent, such that the SDN controller may receive the telemetry data from the agent. Additionally, or alternatively, the agent may be running on a switch in the network, and the SDN controller may receive the telemetry data from the network switch that the agent is running on.

The SDN controller may provide the telemetry data to a lifecycle determination system running on remote computing resources of a remote service provider network. For instance, the telemetry data may be transmitted from the SDN controller of the computing resource network to a lifecycle determination component of the service provider network where the telemetry data is utilized to generate a user interface (UI) to present content for progressing through stages of the experience lifecycle of the computing-based solution. The lifecycle determination component may utilize the telemetry data to populate a lifecycle template associated with the computing-based solution with content that includes information for progressing through stages of the experience lifecycle of the computing-based solution.

In some examples, the telemetry data may be operational data associated with the computing-based solution(s), such as, for example, health related information associated with the computing-based solution(s) (i.e., security vulnerabilities, bugs associated with the solution, etc.), and/or usage data associated with the computing-based solution(s), such as, for example, telemetry around usage of a product associated with the computing-based solution. The lifecycle determination system may utilize the telemetry data to determine a progression of the user account through stages of an experience lifecycle of the computing-based solution. For example, using the telemetry data, the system may determine that the user has progressed to a first stage of an experience lifecycle for the computing-based solution. The stages of the experience lifecycle of the computing-based solution may be specific to the computing-based solutions, such that the stages correspond to actions required by the user to progress through the experience lifecycle. For example, the stages may include, but are not limited to onboarding, implementation, usage, engagement, and adoption of the computing-based solution. Additional stages may include, but are not limited to, a discovery stage, an evaluation stage, a solution selection stage, a purchase stage, an optimization stage, a renewal stage, a recommendation stage, an advocation/evangelizing stage, and/or a stage to buy more and/or buy other computing-based solutions. Additionally, or alternatively, the telemetry data may include indications of the progression of the user through substages of the stages of an experience lifecycle of the computing-based solution. For example, using the telemetry data, the system may determine that the user has progressed to a first substage of a first stage of the experience lifecycle for the computing-based solution. The substages of a stage of an experience lifecycle of the computing-based solution may be specific to the computing-based solution, such that the substages correspond to actions required by the user account to progress through a stage of the experience lifecycle.

The lifecycle determination system may include various components, such as, for example, one or more processors, one or more network interfaces, and/or one or more computer-readable media. The one or more computer-readable media may store instructions to operate a lifecycle component of the lifecycle determination system. The lifecycle component may include, for example, a telemetry component, a determination component, a content mapping component, a portal generation component, and/or a health score component. The health score component may include, for example, an overall completion component and/or a stage completion component. Additionally, or alternatively, the lifecycle determination system may include a data store. The data store may include various data, such as, for example, telemetry data, a lifecycle template library, a supplemental content library, and/or user account data.

The lifecycle determination system may utilize the telemetry data to make various determinations. In some examples, the lifecycle determination system may utilize the telemetry data to identify an association between a stage of the experience lifecycle to which the user has progressed, and content that includes information for progressing to the next stage in the experience lifecycle. Additionally, or alternatively, the lifecycle determination system may utilize the telemetry data to identify an association between a substage of a stage of the experience lifecycle to which the user has progressed, and supplemental content that includes information for progressing to the next substage of the stage in the experience lifecycle. Further, the lifecycle determination system may determine a lifecycle template that corresponds to the experience lifecycle of the computing-based solution and may populate the template with the content that includes the information for progressing through the stages of the experience lifecycle and/or the supplemental content that includes the information for progressing through the substages of the stage of the experience lifecycle. Additionally, or alternatively, the lifecycle determination system may have access to user accounts indicating the computing-based solutions that are being utilized by the user.

The lifecycle determination system may then provide a user account associated with the user with access to indications of the determinations mentioned above. In some examples, the lifecycle determination system may generate lifecycle data that may include data associated with the experience lifecycle for the computing-based solution. For example, the lifecycle data may include indications of the stage to which the user account has progressed in the experience lifecycle for the computing-based solution. Additionally, or alternatively, the lifecycle data may include indications of the substages of the stage to which the user account has progressed in the experience lifecycle for the computing-based solution. In some examples, the lifecycle data may include indications of individual metrics and/or tasks that must be completed for a user account to progress through a stage of the experience lifecycle. Additionally, or alternatively, the lifecycle data may include indications of the content that includes the information for progressing from the stage to which the user account has progressed to a subsequent stage in the experience lifecycle for the computing-based solution. Additionally, or alternatively, the lifecycle data may include indications of the additional content that includes the supplemental information for progressing from the substage to which the user account has progressed to a subsequent substage of the stage in the experience lifecycle for the computing-based solution. In some examples, the lifecycle determination system may generate one or more user interfaces (UIs) for display on a computing device associated with the user account. In some examples, the UI may be populated with lifecycle data including the indications described above. In some examples, the lifecycle data may include the one or more UIs.

The UIs may be configured to receive input from a computing device associated with the user profile. In some examples, the UI(s) may be configured to present supplemental content in response to receiving the input from the computing device associated with the user profile. In some examples, the computing device associated with the user account may be configured to receive input in a number of ways, such as, for example, touch input and/or input received from a peripheral device communicatively coupled to the computing device.

The lifecycle determination system may transmit the one or more UIs to a computing device associated with the user accounts over a network. In some examples, the lifecycle determination system may transmit a UI that corresponds to the current stage and/or substage to which the user has progressed in the experience lifecycle for the computing-based solution. Additionally, or alternatively, the lifecycle determination system may transmit a plurality of UIs corresponding to respective stages and/or substages of the experience lifecycle for the computing-based solution.

In some examples, the UIs may include a user portal for displaying the user account progression through the experience lifecycle of the computing-based solution. The portal may be generated by mapping the content, including the information for progressing through stages and/or substage of an experience lifecycle for a computing-based solution, to content placeholders of a lifecycle template. Additionally, or alternatively, the portal may include a number of methods/layouts to present the information, such as, for example, a checklist depiction of the stages, substages, and/or content, a table depiction of the stages, substages, and/or the content, a racetrack depiction of the stages, substages (also referred to as pit stops), and/or the content, and/or other depictions for presenting blocks of the stages, substages, and/or the content. In some examples, the portal may include one or more metrics representing the stage to which the user account has progressed of a plurality of stages in the experience lifecycle for the computing-solution. Additionally, or alternatively, the one or more metrics may represent a substage to which the user account has progressed of a plurality of substages of a stage of the experience lifecycle for the computing-based solution. The one or more metrics may be represented by a percentage, fraction, or any other indicator representing progression through a lifecycle. In some examples, the portal may include additional information associated with the computing-based solution, such as, for example, security information, user account information, and the like.

As described herein, a computing-based solution can generally include any type of resources implemented by virtualization techniques, such as containers, virtual machines, virtual storage, and so forth. Further, although the techniques described as being implemented in data centers and/or a cloud computing network, the techniques are generally applicable for any network of devices managed by any entity where virtual resources are provisioned. In some instances, the techniques may be performed by a schedulers or orchestrator, and in other examples, various components may be used in a system to perform the techniques described herein. The devices and components by which the techniques are performed herein are a matter of implementation, and the techniques described are not limited to any specific architecture or implementation.

The techniques described herein provide various improvements and efficiencies with respect to determining a stage of a plurality of stages of an experience lifecycle of a computing-based solution to which a user account has progressed and presenting content including information for progressing from the stage to a subsequent stage of the experience lifecycle. For instance, the techniques described herein may collect telemetry data indicative of usage of a computing-based solution by one or more computing devices of a computing resource network. By utilizing the telemetry data, a lifecycle determination system may identify content that includes information for progressing through a plurality of stages in the experience lifecycle and populate one or more lifecycle templates to include on a user interface for display on a computing device associated with the user account.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system architecture diagram 100 of an example flow for collecting telemetry data indicating usage of a computing-based solution hosted in a computing resource network 102 to ascertain a stage of progression through an experience lifecycle for the computing-based solution, and to generate data for populating lifecycle templates, with content for progressing from the stage to the next stage of the experience lifecycle, to include on a user interface for display on a computing device associated with a user account. The computing resource network 102 may comprise one or more data centers 104 that include various networking components, such as, a Software-Defined-Networking (SDN) controller 106, spine network switches 108 (also referred to as spine nodes), and leaf network switches 110 (also referred to as leaf nodes) operating on physical servers. In some examples, the computing resource network 102 may be a distributed network through which users (often customers) may interact via user devices to manage or otherwise interact with computing-based services, or solutions 112, provided by the computing resource network 102.

The computing resource network 102 may provide on-demand availability of computing system resources of physical server(s), such as data storage, computing power (e.g., CPU, GPU, etc.), networking, databases, etc., without direct active management by users. In some examples, the computing resource network 102 may be managed and maintained by a service provider such that users do not have to invest in and maintain the computing infrastructure for their computing resource needs. Generally, a user may be provided access to, or allocated use of, a portion of the computing resources of physical server(s) in the computing resource network 102. The computing resource network 102 may scale, such as by spinning up resources or spinning down resources, based on demand for the individual users. The portions of the computing resource network 102 may be allocated using hardware virtualization such that portions of the computing resource network 102 can be configured and managed by the user (e.g., security configuration, load balancing configuration, etc.). However, the computing resource network 102 need not be managed by a service provider, and can be managed by any entity, including the user themselves that run the applications or services.

In some examples, physical server(s) may host one or more virtual machines. Each virtual machine may be configured to execute one of various operations and act as one or more virtual components for the computing resource network 102, such as, for example, computing-based solution 112. In some examples, the physical server(s) may host any number of virtual machines. In some examples, physical server(s) in the cloud computing network 102 may host the various network components of the computing resource network 102, such as, for example, the spine network switch(es) 108 and/or the leaf network switch(es) 110. Additionally, or alternatively, one or more software agents may be operating on the one or more spine network switch(es) 108 and/or the leaf network switch(es) 110. The software agent(s) may be in communication with the SDN controller 106.

In some examples, the SDN controller 106 may be in communication with one or more remote computing resources 114 disposed in a service provider network 116, via one or more suitable data communications network(s) 118. The one or more remote computing resources 114 may include one or more network interface(s) 120 for communicating with the SDN controller 106 and/or other devices configured to send and receive data over the one or more network(s) 118. Additionally, or alternatively, the one or more remote computing resources 114 may include one or more computer-readable media 122 and/or one or more processor(s) 124 for executing instructions stored on the computer-readable media 122. In some examples, the computer-readable media 122 may include one or more data store(s) 126 and/or a lifecycle component 128.

In some examples, a virtual machine may be configured to execute one of various computing-based solutions 112 offered by a service provider. A service provider may offer computing-based solutions 112 to tend to a various computing resource needs such as, for example, analytics and automation, artificial intelligence, intent-based networking, network architecture, software-defined networking, security, and the like. The computing-based solutions 112 may vary in complexity, and a user 130 manipulating such computing-based solutions 112 may require guidance throughout an experience lifecycle of the computing-based solution 112.

Generally, the number of virtual resources and/or computing-based solutions 112 may scale based on a number of users 130 interacting with the cloud computing network. The users 130 may comprise one or more of individual users, groups of users, organizations, businesses, or other entities that interact with the computing resource network 102 via respective user devices. The user devices may be any type of computing device capable of connecting to the computing resource network 102 via the data communications network 118 such as, but not limited to, a laptop or desktop computer, a tablet computing device, a server computer, a television, or a mobile telephone. Administrative users employed by the operator of the computing resource network 102, such as administrators managing the operation of the computing resource network 102, might also connect with, manage, and utilize resources provided by the service provider network 116 in a similar fashion.

The users 130 may provide input data 132 via the network(s) 118 to interact with the computing-based solution 112 running on the servers. For example, the users 130 may submit requests to process data, retrieve data, store data, and so forth such that virtual machines hosting the computing-based solutions 112 are spun up or spun down to process the requests based on demand.

One or more software agent(s) operating on any one of the network nodes 108, 110 may monitor the computing-based solution(s) 112 and collect telemetry data indicating usage of the computing-based solution 112 by one or more computing devices of the computing resource network 102. The one or more software agent(s) may transmit the telemetry data 134 to the network controller 106 disposed in the computing resource network 102. The network controller 106 disposed in the computing resource network 102 may transmit the telemetry data 134 via the one or more network(s) 118 to the remote computing resource(s) 114 disposed in the service provider network 116. The lifecycle component 128 and the data store(s) 126 of the remote computing resource(s) 114 may utilize the telemetry data 134 to ascertain a stage to which a user account associated with the computing-based solution 112 has progressed in an experience lifecycle for the computing-based solution 112. The lifecycle component 128 may generate lifecycle data 136 to transmit via the one or more networks 118 to a computing device associated with a user account of the user 130. In some examples, the lifecycle data 136 may include one or more user interface(s) (UIs) 138, generated using templates and content stored in the one or more data stores 126, for presentation on the computing device associated with the user account. The template(s) may correspond to the one or more computing-based solution(s) 112, and the content may include information for progressing from the current stage to which the user account associated with the computing-based solution 112 has progressed to a subsequent stage of a plurality of stages in the experience lifecycle for the computing-based solution 112.

In some examples, the one or more software agents may periodically collect telemetry data 134 throughout the lifecycle of the computing-based solution(s) 112 to track the progression of the user account through the experience lifecycle of the computing-based solution(s) 112. In some examples, the network controller 106 may be in communication with the one or more software agent(s), such that the network controller 106 may receive the telemetry data 134 from an agent. Additionally, or alternatively, an agent may be running on a switch, or a node, in the network 108, 110, and the network controller 106 may receive the telemetry data 134 from the network switch 108, 110 that the agent is running on.

The network controller 106 disposed in the computing resource network 102 may provide the telemetry data 134 to a lifecycle determination system running on the remote computing resources 114 of a remote service provider network 116. For instance, the telemetry data 134 may be transmitted via the one or more networks 118 from the network controller 106 of the computing resource network 102 to a lifecycle determination component 128 of the service provider network 116 where the telemetry data 134 is utilized to generate lifecycle data 136, which may include one or more UI(s) 138 to present content which includes information for progressing through stages of the experience lifecycle of the computing-based solution 112. The lifecycle determination component 128 may utilize the telemetry data 134 to populate a lifecycle template associated with the computing-based solution 112 with content that includes information for progressing through stages of the experience lifecycle of the computing-based solution 112.

In some examples, the telemetry data 134 may be operational data associated with the computing-based solution(s) 112, such as, for example, health related information associated with the computing-based solution(s) 112 (i.e., security vulnerabilities, bugs associated with the solution, etc.), and/or usage data associated with the computing-based solution(s) 112, such as, for example, telemetry around usage of a product associated with the computing-based solution 112. The lifecycle determination component 128 may utilize the telemetry data 134 to determine a progression of a user account through stages of an experience lifecycle of the computing-based solution 112. For example, using the telemetry data 134, the lifecycle component 128 may determine that the user account has progressed to a first stage of an experience lifecycle for the computing-based solution 112. The stages of the experience lifecycle of the computing-based solution 112 may be specific to the computing-based solutions 112, such that the stages correspond to actions required by the user account to progress through the experience lifecycle. For example, the stages may include, but are not limited to onboarding, implementation, usage, engagement, and adoption of the computing-based solution 112. Additionally, or alternatively, the telemetry data 134 may include indications of the progression of the user account through substages of the stages of an experience lifecycle of the computing-based solution 112. For example, using the telemetry data 134, the lifecycle component 128 may determine that the user account has progressed to a first substage of a first stage of the experience lifecycle for the computing-based solution 112. The substages of a stage of an experience lifecycle of the computing-based solution may be specific to the computing-based solution 112, such that they substages correspond to actions required by the user to progress through a stage of the experience lifecycle.

The lifecycle determination component 128 may utilize the telemetry data 134 to make various determinations. In some examples, the lifecycle determination component 128 may utilize the telemetry data 134 to identify an association between a stage of the experience lifecycle of the computing-based solution 112 to which the user account has progressed, and content that includes information for progressing to the next stage in the experience lifecycle. Additionally, or alternatively, the lifecycle determination component 128 may utilize the telemetry data 134 to identify an association between a substage of a stage of the experience lifecycle of the computing-based solution to which the user account has progressed, and supplemental content that includes information for progressing to the next substage of the stage in the experience lifecycle. Further, the lifecycle determination component 128 may determine a lifecycle template that corresponds to the experience lifecycle of the computing-based solution and may populate the template with the content that includes the information for progressing through the stages of the experience lifecycle of the computing-based solution 112 and/or the supplemental content that includes the information for progressing through the substages of the stage of the experience lifecycle. Additionally, or alternatively, the lifecycle determination component 128 may have access to user accounts indicating the computing-based solutions 128 that are being utilized by the user account.

The lifecycle determination component 128 may then utilize the one or more network interface(s) 120 to transmit to a user account, via the one or more data networks 118, indications of the determinations mentioned above. In some examples, the lifecycle determination component 128 may generate the lifecycle data 136 that may include data associated with the experience lifecycle for the computing-based solution 112. For example, the lifecycle data 136 may include indications of the stage to which the user account has progressed in the experience lifecycle for the computing-based solution 112. Additionally, or alternatively, the lifecycle data may include indications of the substages of the stage to which the user account has progressed in the experience lifecycle for the computing-based solution 112. In some examples, the lifecycle data 136 may include indications of individual metrics and/or tasks that must be completed for a user account to progress through a stage of the experience lifecycle. Additionally, or alternatively, the lifecycle data 136 may include indications of the content that includes the information for progressing from the stage to which the user account has progressed to a subsequent stage in the experience lifecycle for the computing-based solution 112. Additionally, or alternatively, the lifecycle data 136 may include indications of the additional content that includes the supplemental information for progressing from the substage to which the user account has progressed to a subsequent substage of the stage in the experience lifecycle for the computing-based solution 112. As mentioned above, in some examples, the lifecycle determination component 128 may generate one or more UIs 138 display on a computing device associated with the user account. In some examples, the UIs 138 may be populated with lifecycle data including the indications described above. In some examples, the lifecycle data 136 may include the one or more UIs 138.

The UIs 138 may be configured to receive input from a computing device associated with the user profile. In some examples, the UI(s) 138 may be configured to present supplemental content in response to receiving the input from the computing device associated with the user profile. In some examples, the computing device associated with the user account may be configured to receive input in a number of ways, such as, for example, touch input and/or input received from a peripheral device communicatively coupled to the computing device.

The lifecycle determination component 128 may transmit the one or more UIs 138 to a computing device associated with the user accounts via the one or more data network(s). In some examples, the lifecycle determination component 128 may transmit a UI 138 that corresponds to the current stage and/or substage to which the user has progressed in the experience lifecycle for the computing-based solution 112. Additionally, or alternatively, the lifecycle determination component 128 may transmit a plurality of UIs 138 corresponding to respective stages and/or substages of the experience lifecycle for the computing-based solution 112.

In some examples, the UIs 138 may include a portal for displaying the user account progression through the experience lifecycle of the computing-based solution 112. The portal may include various views for presenting the information on the UIs 138 in a number of manners, such as, for example, a checklist depiction of the stages, substages, and/or content, a table depiction of the stages, substages, and/or the content, a racetrack depiction of the stages, substages (also referred to as pit stops), and/or the content, and/or other depictions for presenting blocks of the stages, substages, and/or the content. In some examples, the UI 138 may include one or more metrics representing the stage to which the user account has progressed of a plurality of stages in the experience lifecycle for the computing-solution 112. Additionally, or alternatively, the one or more metrics may represent a substage to which the user account has progressed of a plurality of substages of a stage of the experience lifecycle for the computing-based solution 112. The one or more metrics may be represented by a percentage, fraction, or any other indicator representing progression through a lifecycle of a computing-based solution 112. In some examples, the UI 138 may include additional information associated with the computing-based solution 112, such as, for example, security information, user account information, and the like.

At "1," a service provider may provide a computing-based solution 112 to a user account associated with the service provider. In some examples, the computing-based solution 112 may be deployed on one or more computing devices in the computing resource network 102 and associated with the user account.

At "2," one or more software agent(s) operating on network switches, or nodes, 108, 110 in the computing resource network 102 may collect telemetry data 134 indicative of usage of the computing-based solution 112 by the one or more computing devices in the computing resource network 102.

At "3," the lifecycle component 128 of the remote computing resources 114 disposed in the remote service provider network 116 may utilize the telemetry data 134 to determine a stage, from a plurality of stages, of an experience lifecycle for the computing-based solution 112 to which the user account has progressed. Additionally, or alternatively, the lifecycle component 128 may utilize the telemetry data 134 to determine a substage, from a plurality of substages, of a stage of an experience lifecycle for the computing-based solution 112 to which the user account has progressed. In some examples, the lifecycle component 128 may identify an association between the stage to which the user account has progressed and content that includes information for progressing to a subsequent stage of the plurality of stages in the experience lifecycle for the computing-based solution 112. Additionally, or alternatively, the lifecycle component 128 may identify an association between the substage to which the user account has progressed and additional content that includes supplemental information for progressing to a subsequent substage of the plurality of substages of the stage in the experience lifecycle for the computing-based solution 112.

At "4," the lifecycle component 128 may utilize one or more network interface(s) 120 of the remote computing resources 114 to provide, via the one or more data networks 118, lifecycle data 136 including the information determined above at step "3," to a user account associated with the computing-based solution 112. Additionally, or alternatively, the lifecycle component 128 may transmit the lifecycle data 136 to a computing device associated with the user account, for presentation of the lifecycle data 136 on one or more UIs 138. In some examples, the lifecycle data 136 may include the stage to which the user account has progressed in the experience lifecycle for the computing-based solution 112. In some examples, the lifecycle data 136 may include the content that includes the information for progressing from the current stage to a subsequent stage in the experience lifecycle. Additionally, or alternatively, the lifecycle data 136 may include the additional content that includes the supplemental information for progressing from the current substage to a subsequent substage of the stage in the experience lifecycle.

Figure 2:
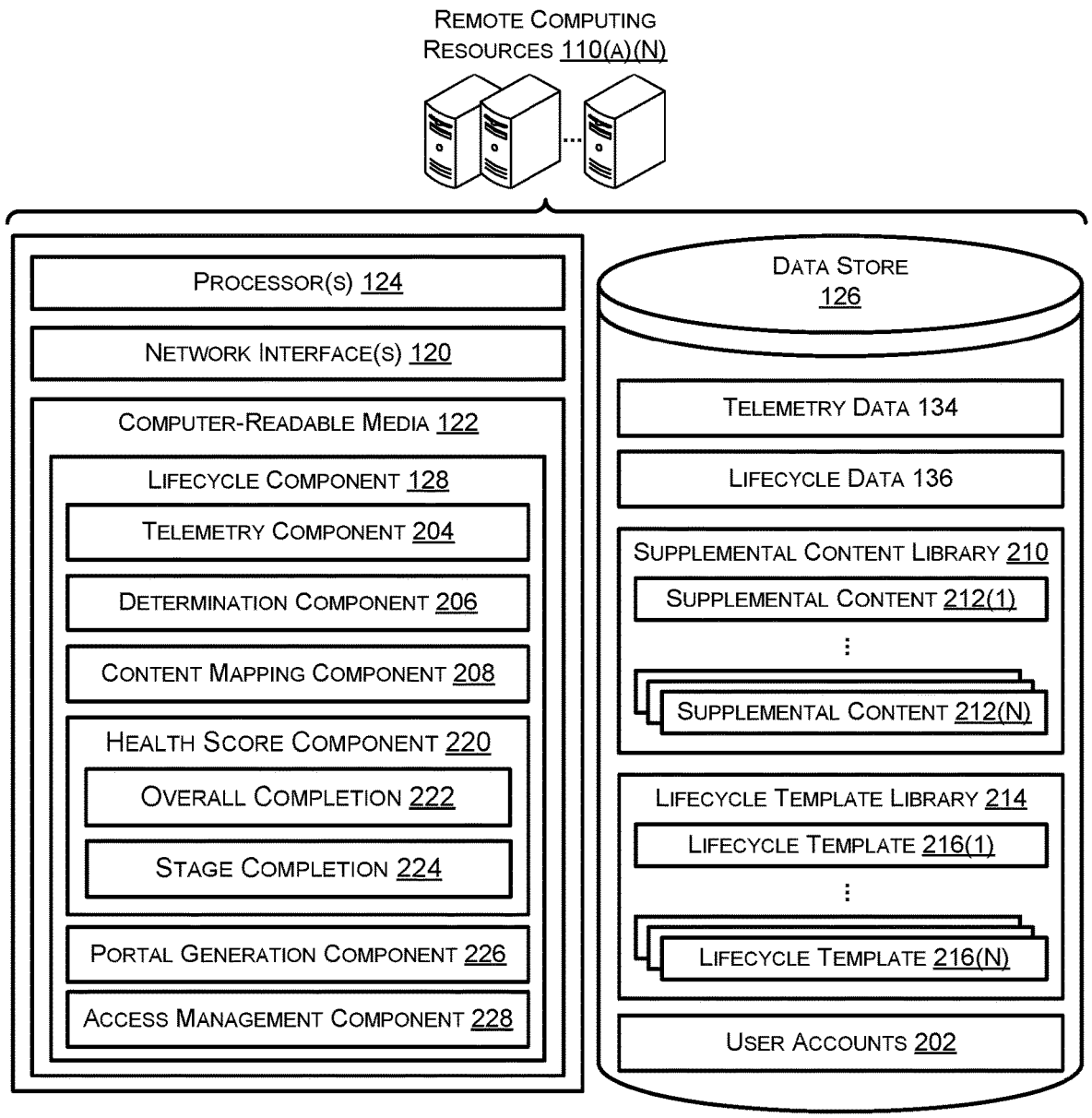
FIG. 2 illustrates a component diagram of example components of a service provider network that utilizes telemetry data to generate experience lifecycle data for populating one or more lifecycle templates to include on a user interface for display on a computing device associated with a user account.

FIG. 2 illustrates a component diagram 200 of example components of remote computing resource(s) 114 of a service provider network 116 that utilize telemetry data 134 to generate experience lifecycle data 136 to present on a user interface for display on a computing device associated with a user account.

As illustrated, the remote computing resource(s) 114 may include one or more hardware processor(s) 124 (processors). The processor(s) 124 may comprise one or more cores. Further, the remote computing resource(s) 114 may include one or more network interface(s) 120 configured to provide communications between the service provider network 116, the computing resource network 102, and other devices, such as a user device. The network interfaces 120 may include devices configured to couple to personal area networks (PANs), wired and wireless local area networks (LANs), wired and wireless wide area networks (WANs), and so forth. For example, the network interfaces 120 may include devices compatible with Ethernet, Wi-Fi, and so forth.

The remote computing resources 114 may also include computer-readable media 122 that stores various executable components (e.g., software-based components, firmware-based components, etc.). In addition to various components discussed in FIG. 1, the computer-readable-media 122 may further store components to implement functionality described herein. While not illustrated, the computer-readable media 122 may store one or more operating systems utilized to control the operation of the one or more devices within the service provider network 116. According to one embodiment, the operating system comprises the LINUX operating system. According to another embodiment, the operating system(s) comprise the WINDOWS SERVER operating system from MICROSOFT Corporation of Redmond, Wash. According to further embodiments, the operating system(s) can comprise the UNIX operating system or one of its variants. It should be appreciated that other operating systems can also be utilized.

Additionally, the remote computing resource(s) 114 may include a data store 126 which may comprise one, or multiple, repositories or other storage locations for persistently storing and managing collections of data such as databases, simple files, binary, and/or any other data. The data store 126 may include one or more storage locations that may be managed by one or more database management systems.

The computer-readable media 122 may further store a lifecycle component 128 that generates lifecycle data 136 utilizing telemetry data 134 indicating usage of a computing-based solution 112 on one or more computing devices associated with a user account 202. The lifecycle component 128 may communicate data between various components of the lifecycle component 128.

The computer-readable media 122 may further store a telemetry component 204 that receives the telemetry data 134. The telemetry data 134 may be operational data associated with the computing-based solution(s) 112, such as, for example, health related information associated with the computing-based solution(s) 112 (i.e., security vulnerabilities, bugs associated with the solution, etc.), and/or usage data associated with the computing-based solution(s) 112, such as, for example, telemetry around usage of a product associated with the computing-based solution 112.

The computer-readable media 122 may further store a determination component 206 that utilizes the telemetry data 134 to determine a progression of the user account through stages of an experience lifecycle of the computing-based solution 112. For example, using the telemetry data 136, the determination component 206 may determine that the user account has progressed to a first stage of a plurality of stages in an experience lifecycle for the computing-based solution 112. The stages of the experience lifecycle of the computing-based solution may be specific to the computing-based solutions 112, such that the stages correspond to actions required by the user account to progress through the experience lifecycle. For example, the stages may include, but are not limited to onboarding, implementation, usage, engagement, and adoption of the computing-based solution 112. Additionally, or alternatively, the determination component 206 may utilize the telemetry data 134 to determine the progression of the user through substages of the stages of an experience lifecycle of the computing-based solution 112. For example, using the telemetry data 136, the determination component may determine that the user has progressed to a first substage of a first stage of the experience lifecycle for the computing-based solution 112. The substages of a stage of an experience lifecycle of the computing-based solution 112 may be specific to the computing-based solution 112, such that the substages correspond to actions required by the user account to progress through a stage of the experience lifecycle.

The computer-readable media 122 may further store a content mapping component 208 that may be configured to access a supplemental content library 210. The supplemental content library may include various supplemental content 212(1)-212(N) for progressing through stages and/or substages of an experience lifecycle for a computing-based solution 112, where N is any integer larger than 1. The content mapping component 208 may identify an association between the stage of an experience lifecycle to which the user account has progressed and content 212 that includes information for progressing to a subsequent stage of the plurality of stages in the experience lifecycle of the computing-based solution 112. Additionally, or alternatively, the content mapping component 208 may identify an association between the substage of a stage of an experience lifecycle to which the user account has progressed and additional content 212 that includes supplemental information to a subsequent substage of a stage in the experience lifecycle for the computing-based solution 112.

The content mapping component 208 may further be configured to access a lifecycle template library 214. The lifecycle template library 214 may include various lifecycle templates 216(1)-216(N) associated with respective computing-based solutions 112, where N is any integer larger than 1. The content mapping component 208 may determine a lifecycle template 216 from the lifecycle template library 214 that corresponds to the experience lifecycle of the computing-based solution 112 and may map the content and/or supplemental content 212 that includes the information for progressing through the stages and/or substages of the experience lifecycle for the computing-based solution 112 to the lifecycle template 216. In some examples, the content mapping component 208 may determine the lifecycle template 216 by accessing user account(s) 202 to identify computing-based solutions associated with the user account. In some examples, the lifecycle templates 216 may be configured to populate a portion of a user interface (UI) to present on a computing device associated with the user account. Additionally, or alternatively, the lifecycle templates 216 may be configured to populate the entirety of a UI to present on a computing device associated with the user account.

The computer-readable media 122 may further store a health score component 220 that utilizes the telemetry data to generate an overall health score, or metric, indicating an overall health of the computing-based solution (i.e., indicating overall progression, security vulnerabilities, bugs, etc.) The health score component 220 may further comprise an overall completion metric component 222 and a stage completion metric component 224. In some examples, the overall completion metric component 222 may generate an overall completion metric that may indicate the overall progression of a user account through a plurality of stages in an experience lifecycle for the computing-based solution 112. For example, the overall completion metric may be reflective of the stage to which the user account has progressed through the experience lifecycle for the computing-based solution 112 (i.e., when the user is in the "use" stage the overall completion metric may be 20 percent of 100 percent). In some examples, the stage completion metric component 224 may generate a stage completion metric that may indicate the progression of a user account through the current stage to which the user account has progressed through the experience lifecycle for the computing-based solution 112. For example, the stage completion metric may be reflective of the substage to which the user account has progressed through a plurality of substages of the current stage in the experience lifecycle for the computing-based solution 112. Additionally, or alternatively, the stage completion metric may indicate the progression of a user account through required tasks to progress from the current stage to a subsequent stage in the experience lifecycle for the computing-based solution 112. The overall completion metric and/or the stage completion metric may be represented by a percentage, fraction, or any other indicator representing progression through a lifecycle.

The computer-readable media 122 may further store a portal generation component 226 for generating a user portal, accessible by one or more computing devices associated with the user account, to display the user account progression through the experience lifecycle of the computing-based solution 112. The portal may display the content 212, including the information for progressing through stages and/or substage of an experience lifecycle for the computing-based solution 112, mapped to the lifecycle template(s) 216. Additionally, or alternatively, the portal may include a number of methods/layouts to present the information, such as, for example, a checklist depiction of the stages, substages, and/or content 212; a table depiction of the stages, substages, and/or the content 212; a racetrack depiction of the stages, substages (also referred to as pit stops), and/or the content 212; and/or other depictions for presenting blocks of the stages, substages, and/or the content 212. In some examples, the portal may include the health score metric, the overall completion metric, and/or the stage completion metric. In some examples, the portal generation component 226 may utilize the telemetry data to include additional information associated with the computing-based solution 112 to include on the portal, such as, for example, security information, user account information, and the like. Additionally, or alternatively, the portal generation component 226 may generate one or more UIs to present on the portal. In some examples, the portal may include a number of tabs or any other layout transition mechanism to transition between the one or more UIs presented on the portal.

The remote computing resources 116 may then transmit lifecycle data 136 (also referred to as UI data), utilizing the one or more network interface(s) 120 via the one or more data networks 118, to the computing device associated with the user account. In some examples, the lifecycle data 136 may include the user portal. Additionally, or alternatively, the lifecycle data 136 may include the one or more UIs. Additionally, or alternatively, lifecycle data 136 may include the supplemental content(s) 212 and/or the lifecycle template(s) 216.

To utilize the services provided by the service provider network 116, users may register for an account with the service provider network 116. For instance, users may utilize a user device to interact with an access management component 228 that allows the users to create user accounts 202 with the service provider network 116. Generally, the access management component 228 may enable the users to manage computing-based solutions 112 and other computing resources securely. Using the access management component 228, the users may manage their computing-based resources 112 as described herein.

The computer-readable media 122 may be used to store and retrieve information, such as program modules, data structures, or other data. It should be appreciated by those skilled in the art that computer-readable storage media is any available media that provides for the non-transitory storage of data and that can be accessed by the remote computing resources 114 in the service provider network 116. In some examples, the operations performed by the service provider network 116, and or any components included therein, may be supported by one or more server devices. Stated otherwise, some or all of the operations performed by the service provider network 116, and or any components included therein, may be performed by one or more computer devices operating in a cloud-based arrangement.

By way of example, and not limitation, computer-readable storage media 206 can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

FIG. 3 illustrates an example overview 300 of an experience lifecycle for a computing-based solution 112 offered by a service provider. In some examples, the overview 300 may be presented on the user portal described with respect to FIG. 2. In some examples, an experience lifecycle may correspond to a use case 302 of experience lifecycle for the computing-based solution 112. In some examples, a use case 302 may include a plurality of stages 304(A)-(F) of the experience lifecycle for the computing-based solution 112. In some examples, the stages 304 may include one or more steps 306, also referred to as substages, which define a task a user account must achieve to progress through an experience lifecycle for the computing-based solution. Each step 306 may have one or more measurement(s) 308 and corresponding success threshold(s) 310 which define the criteria for completing the task, and the measurement of the defined criteria that must be reached to achieve the task.

In an example use case 302, a user account must complete the wireless assurance setup. The user account may navigate through the wireless assurance use case 302 by completing the stages 304(A)-(F) specified for the wireless assurance setup. In some examples, the stages include an onboarding stage 304(A), an implementation stage 304(B), a usage stage 304(C), an engagement stage 304(D), an adoption stage 304(E), and/or an optimization stage 304(F). Additionally, or alternatively, a use case may include additional stages. In some examples, the user account may progress through the stages 304, and an overall completion metric may display an overall progression of the user account through the stages 304 of the experience lifecycle for the computing-based solution 112.

Each stage 304 may include a number of steps 306, or substages, that which a user account must progress through to complete a stage 304. Each substage 306 may have a corresponding measurement definition 308 and/or a success threshold 310 which define the tasks required for a user account to progress through the current stage 304.

In an example, the wireless assurance use case 302, may include an engagement stage 304(D) that may define steps 306(D) that require a certain amount of engagement from a user account with the computing-based solution to progress through the stage 304(D). For example, the engagement stage 304(D) may define a step 306(D) for a user to "scale your network infrastructure." The completion of the step 306(D) may be measured with a defined measurement 308(D) such as, "licensed access points managed, assigned to the site." The measurement 308(D) may be satisfied when the defined success threshold 310(D) is satisfied. For example, the step 306(D) to "scale your network infrastructure" may be satisfied when the defined measurement 308(D) "licensed access points managed, assigned to the site" reaches the defined success threshold 310(D) of ">80%." In other words, a user account has progressed through a substage 306(D), focused on scaling network infrastructure, of the engagement stage 304(D) when greater-than or equal to 80% of the licensed access points are managed and assigned to the site.

Figure 4:
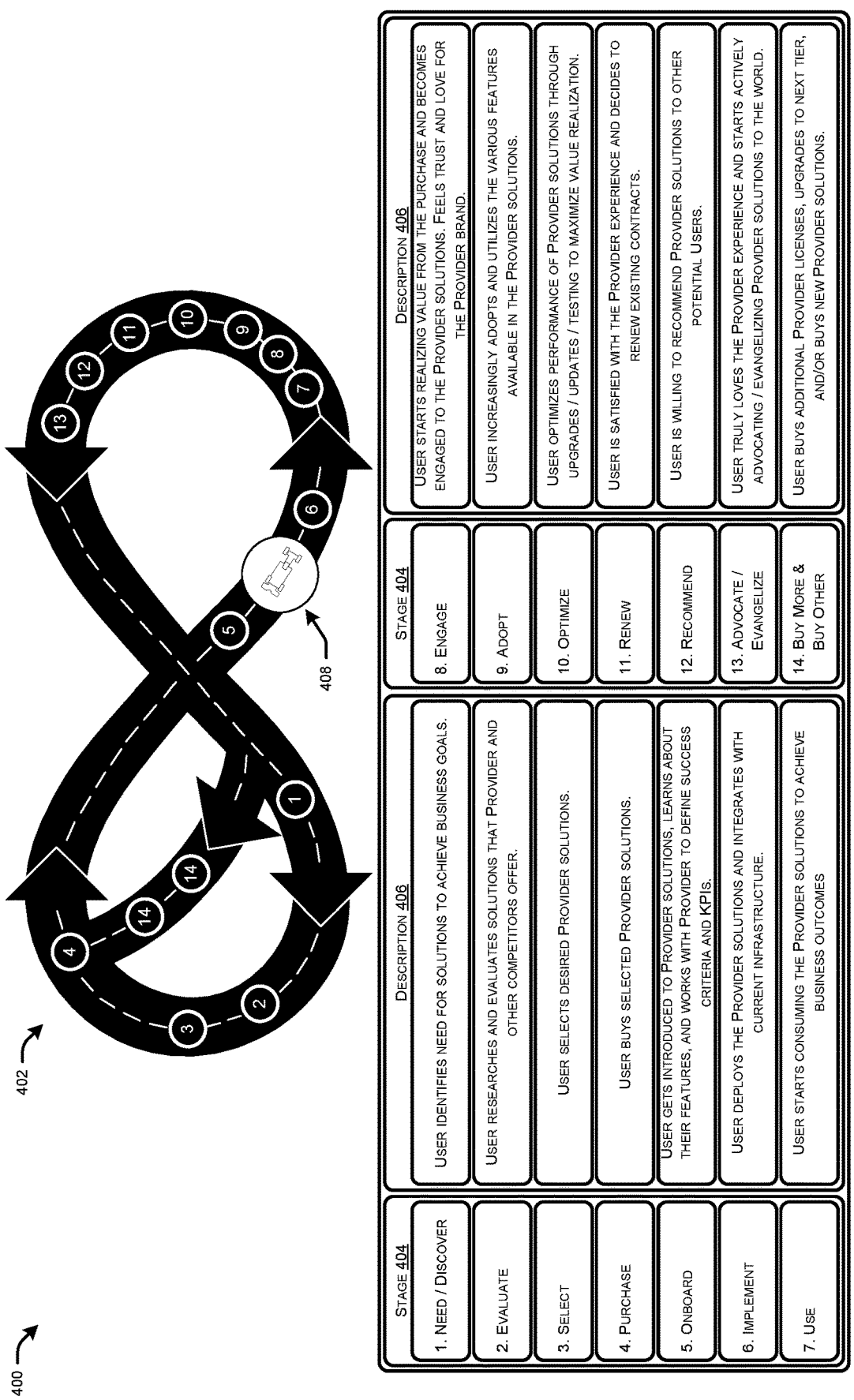
FIG. 4 illustrates an example flow diagram of an experience lifecycle for a computing-based solution offered by a service provider.

FIG. 4 illustrates an example flow diagram 400 (or racetrack) of an experience lifecycle for a computing-based solution 112 offered by a service provider. In some examples, the experience lifecycle for a computing-based solution 112 may be presented as a racetrack 402, and/or may be presented on the user portal as described with respect to FIG. 2. In some examples, the racetrack 402 may present a high-level overview of the experience lifecycle for the computing-based solution 112.

The racetrack 402 may include a number of stages 404 (also referred to as pitstops) and may be represented by a number on the racetrack (see 1-14 on 402). The pit stops 404 may include, but are not limited to, a need or discovery stage (1), an evaluation stage (2), a selection stage (3), a purchase stage (4), an onboarding stage (5), an implementation stage (6), a usage stage (7), an engagement stage (8), an adoption stage (9), an optimization stage (10), a renewal stage (11), a recommendations stage (12), an advocation or evangelization stage (13), and/or a stage to buy more (14) and buy other (14) computing-based solutions 112. In some examples, each stage 404 may include a high-level description 406 that corresponds to the respective stage 404, such that it provides a high-level explanation as to what a user account must achieve to progress through the stage. In some examples, the racetrack 402 may include one or more icons 408 indicating a user's progress through the experience lifecycle for a computing-based solution 112.

In an example, the remote computing resources 114 may utilize the telemetry data 134 and to determine that a user account has progressed to stage 5 of the experience lifecycle, in this example, the onboarding stage. The racetrack 402 may reflect this progress by portraying the user icon 408 at and/or near the $5^{th}$ pitstop 404 on the racetrack 402. Additionally, or alternatively, the $5^{th}$ stage may be presented in the stage column 404 as the onboard stage. An associated high-level description of the tasks a user account must complete to progress from the $5^{th}$ stage to the $6^{th}$ stage in the experience lifecycle may be presented in the description column 406. For example, the description column may describe the actions in the $5^{th}$ stage as "user gets introduced to provider solutions, learns about their features, and works with provider to define success criteria and KPIs" (Key Progress Indicators). This definition 406 may indicate to a user that during stage 5, the user will become familiar with the computing-based solution 112, learn about the features of the computing-based solution, and work with the service provider to define indicators of progress through the experience lifecycle for the computing-based solution.

As mentioned above, the progress through the experience lifecycle for the computing-based solution 112 may be determined by the service provider network 116 utilizing telemetry data collected by software agents running in the computing resource network 102 indicative of usage of the computing-based solution 112 by one or more computing devices of the computing resource network 102. The progression of the user account may be ascertained and tracked utilizing any of the methods described above with respect to FIGS. 1 and/or 2.

Figure 5:
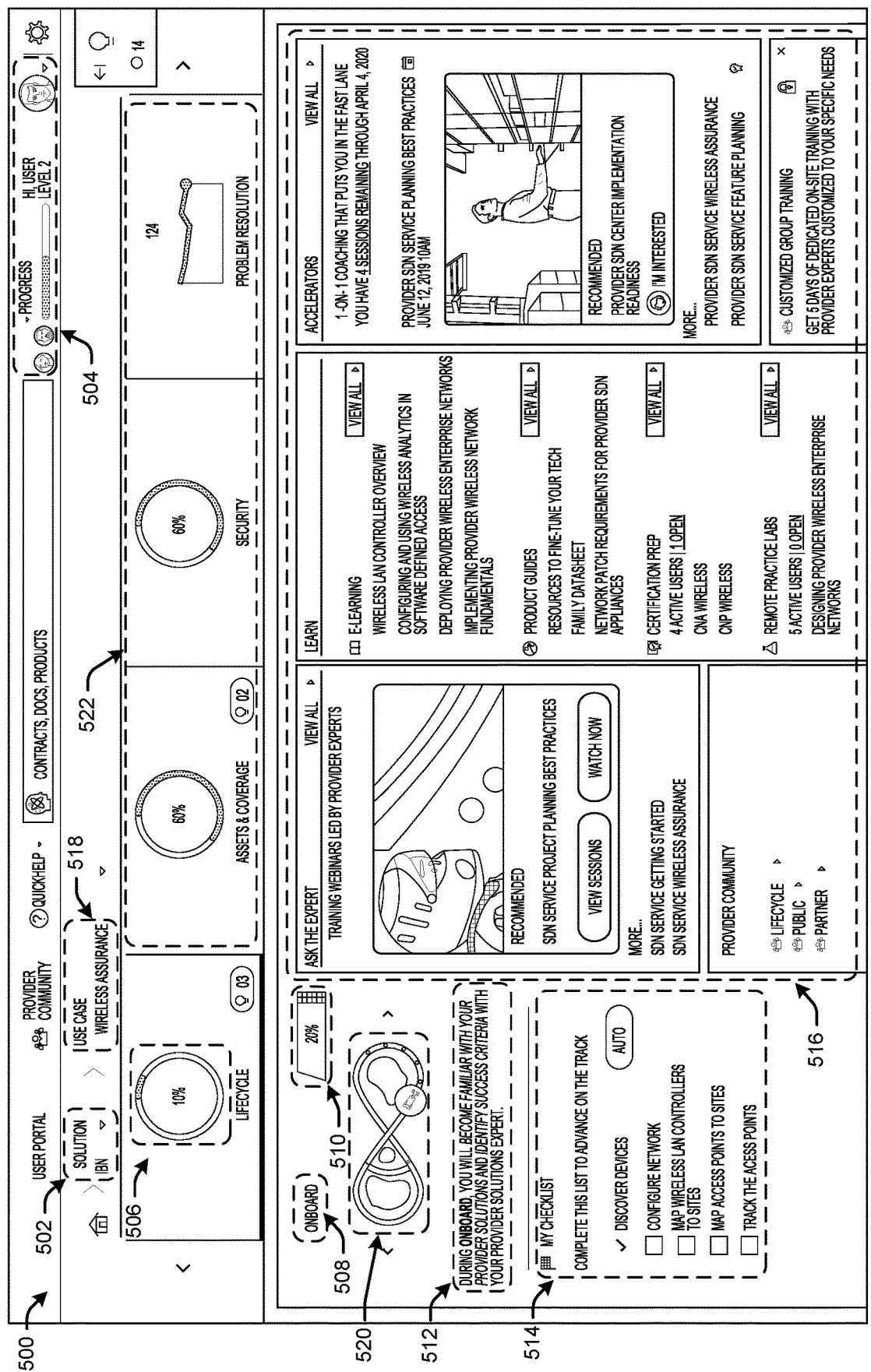
FIG. 5 illustrates a schematic diagram of an example user portal for presenting information associated with an experience lifecycle for a computing-based solution.

FIG. 5 illustrates a schematic diagram of an example user portal 500 for presenting information associated with an experience lifecycle for a computing-based solution 112. In some examples, the user portal 500 may be generated utilizing any of the methods and/or include any of the features described above with respect to FIG. 2. In some examples, the user portal 500 may be comprised of a number of portions populated with data determined by the service provider network 116. In some examples, the user portal 500 may include the lifecycle templates 216 and/or the supplemental content 212 described above with respect to FIG. 2.

The user portal 500 may be configured to be presented on a computing device associated with a user account associated with the computing-based solution. The user portal 500 may be configured to act as a user interface, such that it may receive input from a user interacting with the computing device associated with the user account. The user portal may receive input such as touch input, audio input, and/or any input received from a peripheral device communicatively coupled to the computing device associated with the user account.

In some examples, the user portal 500 may include a portion indicating the computing-based solution 502 and/or the service provider providing the computing-based solution 502.

In some examples, the user portal 500 may include a portion indicating a user account 504 and/or progression of a user account through stages and/or substages of an experience lifecycle for the computing-based solution 502. Additionally, or alternatively, the user portal 500 may include an overall completion metric 506, indicating a progression of the user account 504 through the experience lifecycle for the computing-based solution. In some examples, the overall completion metric 506 may be determined by the overall completion component 222 described with respect to FIG. 2.

In some examples, the user portal 500 may include a portion indicating the stage 508 to which a user account 504 has progressed in the experience lifecycle for the computing-based solution 502. In some examples, the user portal 500 may include a stage completion metric 510, indicating a progression of the user account 504 through the current stage 508 to which the user account 504 has progressed in the experience lifecycle for the computing-based solution 502. In some examples, the stage completion metric 510 may be determined by the stage completion component 224 described with respect to FIG. 2. In some examples, the user portal 500 may include a portion indicating a high-level description 512 of the stage 508 to which the user account 504 has progressed in the experience lifecycle for the computing-based solution 502. In some examples, the user portal may include a portion a checklist 514, or tasks, which the user account 504 must complete to progress through the stage 508 of the experience lifecycle for the computing-based solution 502. In some examples, the user portal may include one or more portions for presenting the content and/or supplemental content 516 for progressing from the current stage 508 to which the user account 504 has progressed to a subsequent stage in the experience lifecycle for the computing-based solution 502.

In some examples, the user portal 500 may include a portion indicating a use case 518 of the computing-based solution 502. In some examples, selection of portion of the user portal 500 indicating the use case 518 may cause the user portal 500 to present the use case 302 as described and depicted with respect to FIG. 3. Additionally, or alternatively, the user portal 500 may include a portion depicting the experience lifecycle for the computing-based solution 502 as a racetrack 520. In some examples, the racetrack 520 may include the same or similar components and/or information as the racetrack 402 described with respect to FIG. 4. In some examples, selection of the portion of the user portal 504 depicting the racetrack 520 may cause the user portal 500 to present the racetrack 402 as described and depicted with respect to FIG. 4.

In some examples, the user portal 500 may include a portion including additional information tabs 522. In some examples, the additional information tabs 522 may include additional information associated with the computing-based solution 502, including but not limited to, security information, information regarding assets and coverage, information regarding problem resolution, and the like. In some examples, each of the additional information tabs 522 may include a metric associated with the respective tab, indicating an overall health of the respective tab.

Figure 6:
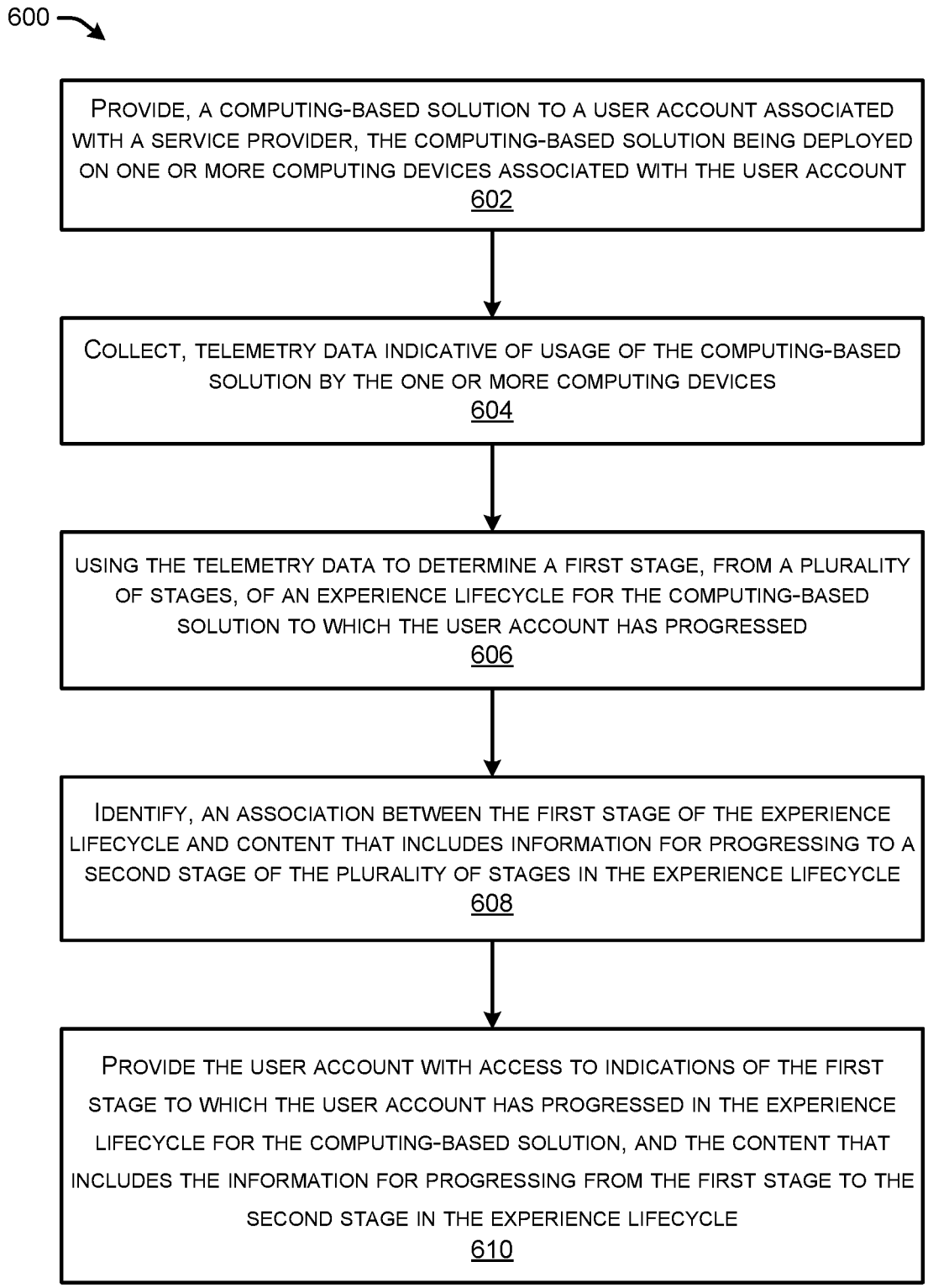
FIG. 6 illustrates a flow diagram of an example method for a service provider network collecting telemetry data indicative of usage of a computing-based solution and providing a user account with indications of a stage to which the user account has progressed and content for progressing from the stage to a subsequent stage in an experience lifecycle.
Figure 7:
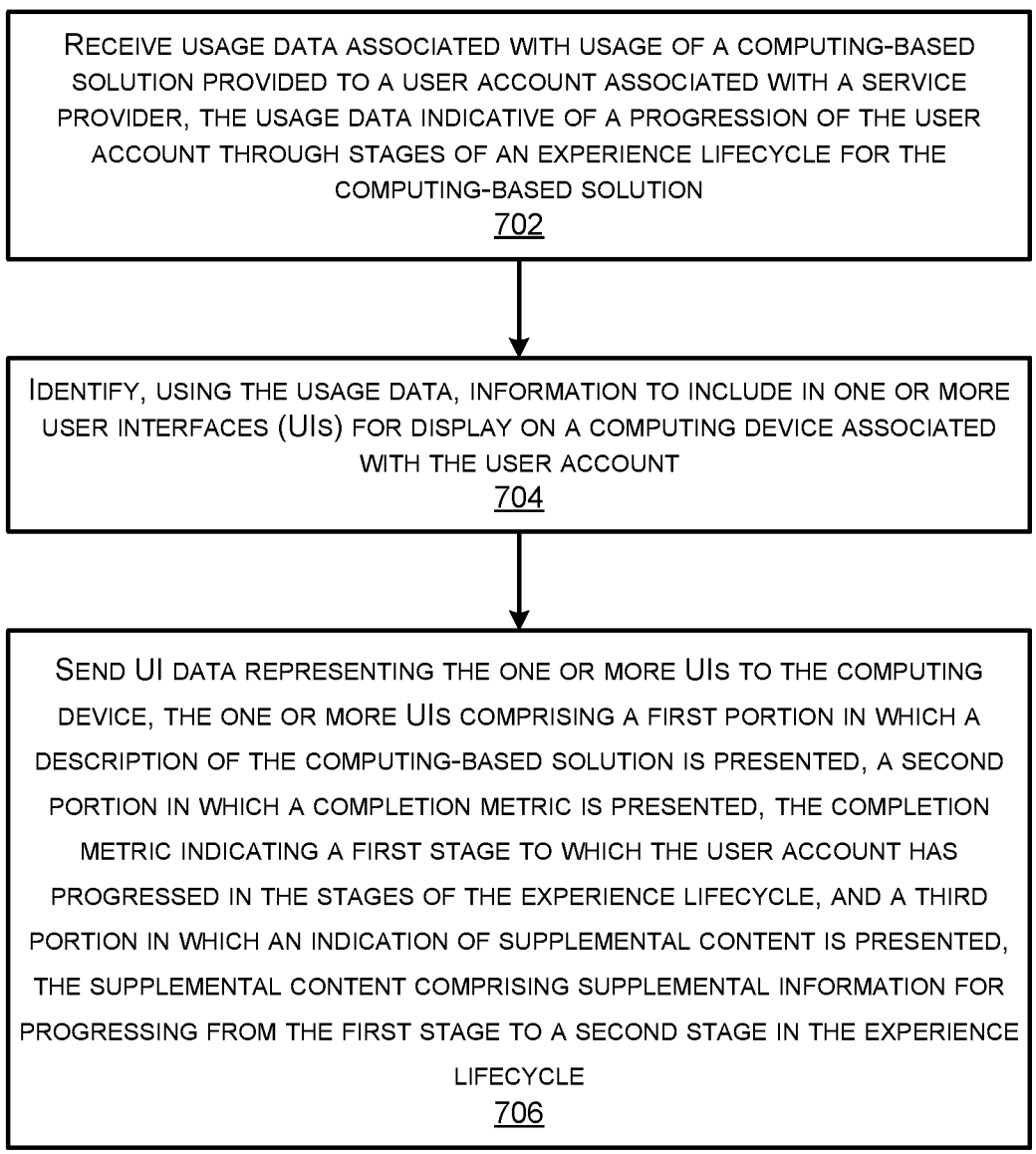
FIG. 7 illustrates a flow diagram of an example method for a service provider network receiving usage data associated with usage of a computing-based solution and sending user interface data, including a description of the computing based solution, a completion metric indicating a stage to which the a user account has progressed, and content including information for progressing from the stage to a subsequent stage in an experience lifecycle, to a computing device associated with a user account.
Figure 8:
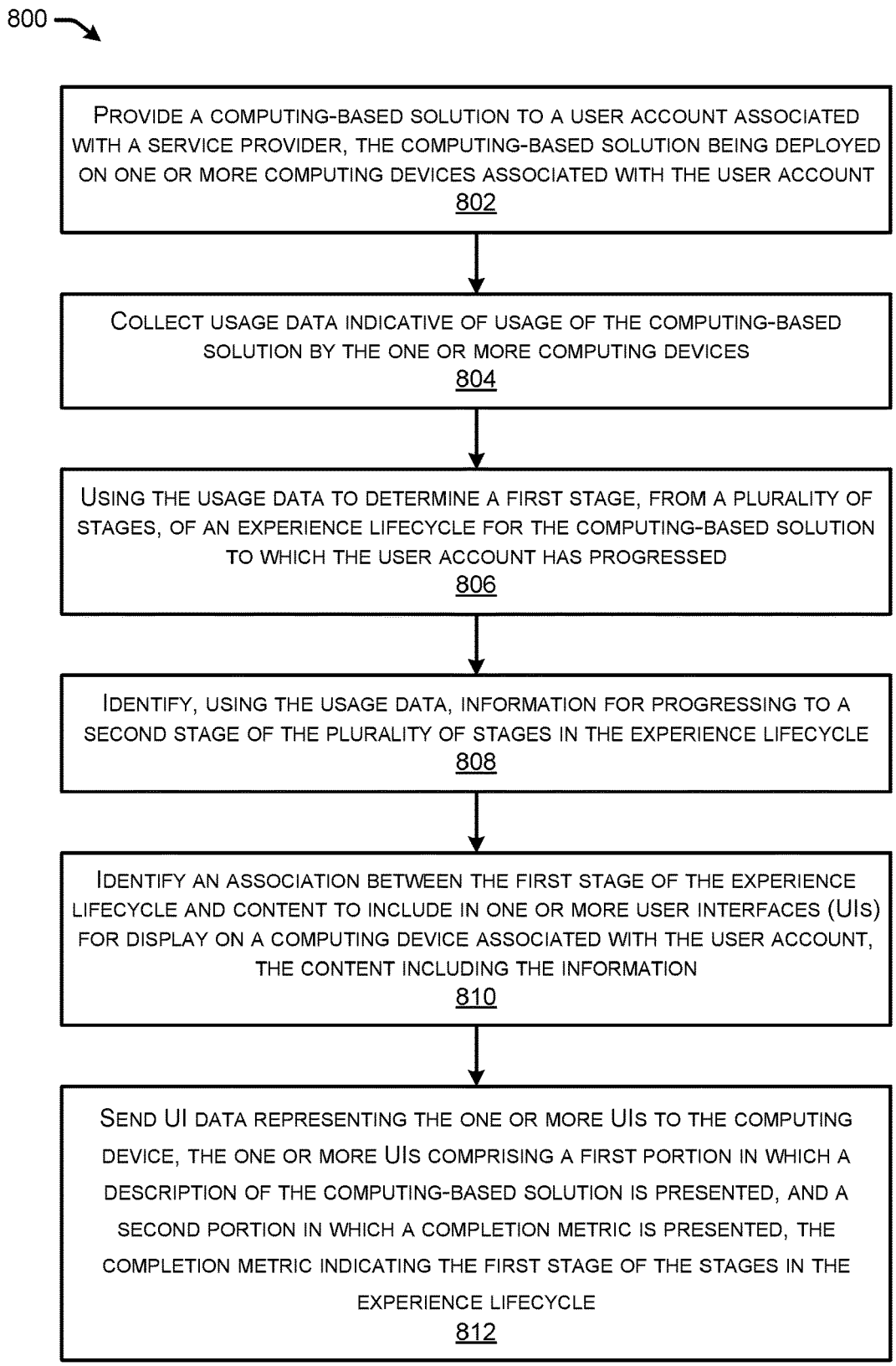
FIG. 8 illustrates a flow diagram of an example method for a service provider network providing a computing-based solution to a user account, collecting telemetry data indicative of the usage of the computing based solution, and sending user interface data, including a description of the computing based solution, and a completion metric indicating a stage to which the a user account has progressed, to a computing device associated with a user account.

FIGS. 6-8 illustrate flow diagrams of example methods 600, 700, and 800 and that illustrate aspects of the functions performed at least partly by the computing resource network 102 and/or the service provider network 116 as described in FIGS. 1 and 2. The logical operations described herein with respect to FIGS. 6-8 may be implemented (1) as a sequence of computer-implemented acts or program modules running on a computing system and/or (2) as interconnected machine logic circuits or circuit modules within the computing system. In some examples, the method(s) 600, 700, and/or 800 may be performed by a system comprising one or more processors and one or more non-transitory computer-readable media storing computer-executable instructions that, when executed by the one or more processors, cause the one or more processors to perform the method(s) 600, 700, and/or 800.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 6-8 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 6 illustrates a flow diagram of an example method 600 for a service provider network 116 collecting telemetry data 134 indicative of usage of a computing-based solution 112 by one or more computing resources and providing a user account with indications of a stage to which the user account has progressed and content for progressing from the stage to a subsequent stage in an experience lifecycle of the computing-based solution 112.

At 602, a service provider network 116 may provide a computing-based solution 112 to a user account associated with a service provider. In some examples, the computing-based solution 112 may be deployed on one or more computing devices associated with the user account. The computing-based solution 112 may be any computing-based solution 112 described above with respect to FIGS. 1 and/or 2.

At 604, the service provider network 116 may collect telemetry data 134 indicative of usage of the computing-based solution 112 by the one or more computing devices. In some examples, the telemetry data 134 may be collected by a software agent utilizing any of the methods described above with respect to FIGS. 1 and/or 2.

At 606, the service provider network 116 may use the telemetry data 134 to determine a first stage, from a plurality of stages, of an experience lifecycle for the computing-based solution 112 to which the user account has progressed. Additionally, or alternatively, the service provider network 116 may use the telemetry data 134 to determine a first substage, from a plurality of substages, of the stage of an experience lifecycle for the computing-based solution 112 to which the user account has progressed.

At 608, the service provider network 116 may identify an association between the first stage of the experience lifecycle and content that includes information for progressing to a second stage of the plurality of stages in the experience lifecycle for the computing-based solution 112. Additionally, or alternatively, the service provider network may identify an association between the first substage of the experience lifecycle and additional content that includes supplemental information for progressing to a second substage of the plurality of substages of the stage in the experience lifecycle for the computing-based solution 112.

At 610, the service provider network 116 may provide the user account with access to indications of the first stage to which the user account has progressed in the experience lifecycle for the computing-based solution 112. In some examples, the service provider network 116 may provide the user account with access to indications of the content that includes the information for progressing from the first stage to the second stage in the experience lifecycle. Additionally, or alternatively, the service provider network 116 may provide the user account with access to indications of the first substage of the stage to which the user account has progressed in the experience lifecycle for the computing-based solution 112. In some examples, the service provider network 116 may provide the user account with access to indications of the additional content that includes the supplemental information for progressing from the first substage to the second substage of the stage in the experience lifecycle for the computing-based solution 112.

FIG. 7 illustrates a flow diagram of an example method 700 for a service provider network 116 receiving usage data associated with usage of a computing-based solution 112 and sending user interface data, including a description of the computing based solution 112, a completion metric indicating a stage to which the a user account has progressed, and content including information for progressing from the stage to a subsequent stage in an experience lifecycle, to a computing device associated with a user account.

At 702, a service provider network 116 may receive usage data associated with usage of a computing-based solution 112 provided to a user account associated with a service provider. In some examples, the usage data may be indicative of a progression of the user account through stages of an experience lifecycle for the computing-based solution 112. In some examples, the usage data may correspond to the telemetry data 134 described above with respect to FIGS. 1 and 2 and may be collected by a software agent utilizing any of the methods for collecting telemetry data 134 described above with respect to FIGS. 1 and/or 2.

At 704, the service provider network 116 may identify, using the usage data, information to include in one or more user interfaces (UIs) 138 for display on a computing device associated with the user account.

At 706, the service provider network 116 may send UI data representing the one or more UIs 138 to the computing device. In some examples, the one or more UIs 138 may comprise a first portion in which a description of the computing-based solution 112 is presented. In some examples, the one or more UIs may comprise a second portion in which a completion metric indicating a first stage to which the user account has progressed in the stages of the experience lifecycle for the computing-based solution 112. Additionally, or alternatively, the one or more UIs 138 may comprise a second portion in which a completion metric indicating a first substage in the substages of the stage to which the user account has progressed in the experience lifecycle for the computing-based solution 112. In some examples, the one or more UIs 138 may comprise a third portion in which an indication of supplemental content is presented. In some examples, the supplemental content may comprise supplemental information for progressing from the first stage to a second stage in the experience lifecycle. Additionally, or alternatively, the supplemental content may comprise supplemental information for progressing from the first substage to a second substage of the stage in the experience lifecycle.

FIG. 8 illustrates a flow diagram of an example method 800 for providing a computing-based solution 112 to a user account, collecting telemetry data 134 indicative of the usage of the computing based solution 112, and sending user interface data, including a description of the computing based solution 112, and a completion metric indicating a stage to which the a user account has progressed, to a computing device associated with a user account.

At 802, a service provider network 116 may provide a computing-based solution 112 to a user account associated with a service provider. In some examples, the computing-based solution 112 may be deployed on one or more computing devices associated with the user account. The computing-based solution 112 may be any computing-based solution 112 described above with respect to FIGS. 1 and/or 2.

At 804, the service provider network 116 may collect usage data associated with usage of a computing-based solution 112 provided to a user account associated with a service provider. In some examples, the usage data may be indicative of a progression of the user account through stages of an experience lifecycle for the computing-based solution 112. In some examples, the usage data may correspond to the telemetry data 134 described above with respect to FIGS. 1 and 2 and may be collected by a software agent utilizing any of the methods for collecting telemetry data 134 described above with respect to FIGS. 1 and/or 2.

At 806, the service provider network 116 may use the usage data to determine a first stage, from a plurality of stages, of an experience lifecycle for the computing-based solution 112 to which the user account has progressed. Additionally, or alternatively, the service provider network 116 may use the usage data to determine a first substage, from a plurality of substages, of the stage of an experience lifecycle for the computing-based solution 112 to which the user account has progressed.

At 808, the service provider network 116 may identify, using the usage data, information for progressing to a second stage of the plurality of stages in the experience lifecycle for the computing-based solution 112. Additionally, or alternatively, the service provider network 116 may identify, using the usage data, information for progressing to a second substage of the plurality of substages of the stage in the experience lifecycle for the computing-based solution 112.

At 810, the service provider network 116 may identify an association between the first stage of the experience lifecycle and content to include on one or more user interfaces (UIs) for display on a computing device associated with the user account. In some examples, the content includes the information for progressing to a second stage of the plurality of stages in the experience lifecycle for the computing-based solution 112. Additionally, or alternatively, the service provider network 116 may identify an association between the first substage of the experience lifecycle and additional content to include on the one or more UIs. In some examples, the additional content includes supplemental information for progressing to a second substage of the plurality of substages of the stage in the experience lifecycle for the computing-based solution 112.

At 812, the service provider network 116 may send UI data representing the one or more UIs 138 to the computing device. In some examples, the one or more UIs 138 may comprise a first portion in which a description of the computing-based solution 112 is presented. In some examples, the one or more UIs may comprise a second portion in which a completion metric indicating a first stage to which the user account has progressed in the stages of the experience lifecycle for the computing-based solution 112. Additionally, or alternatively, the one or more UIs 138 may comprise a second portion in which a completion metric indicating a first substage in the substages of the stage to which the user account has progressed in the experience lifecycle for the computing-based solution 112.

Figure 9:
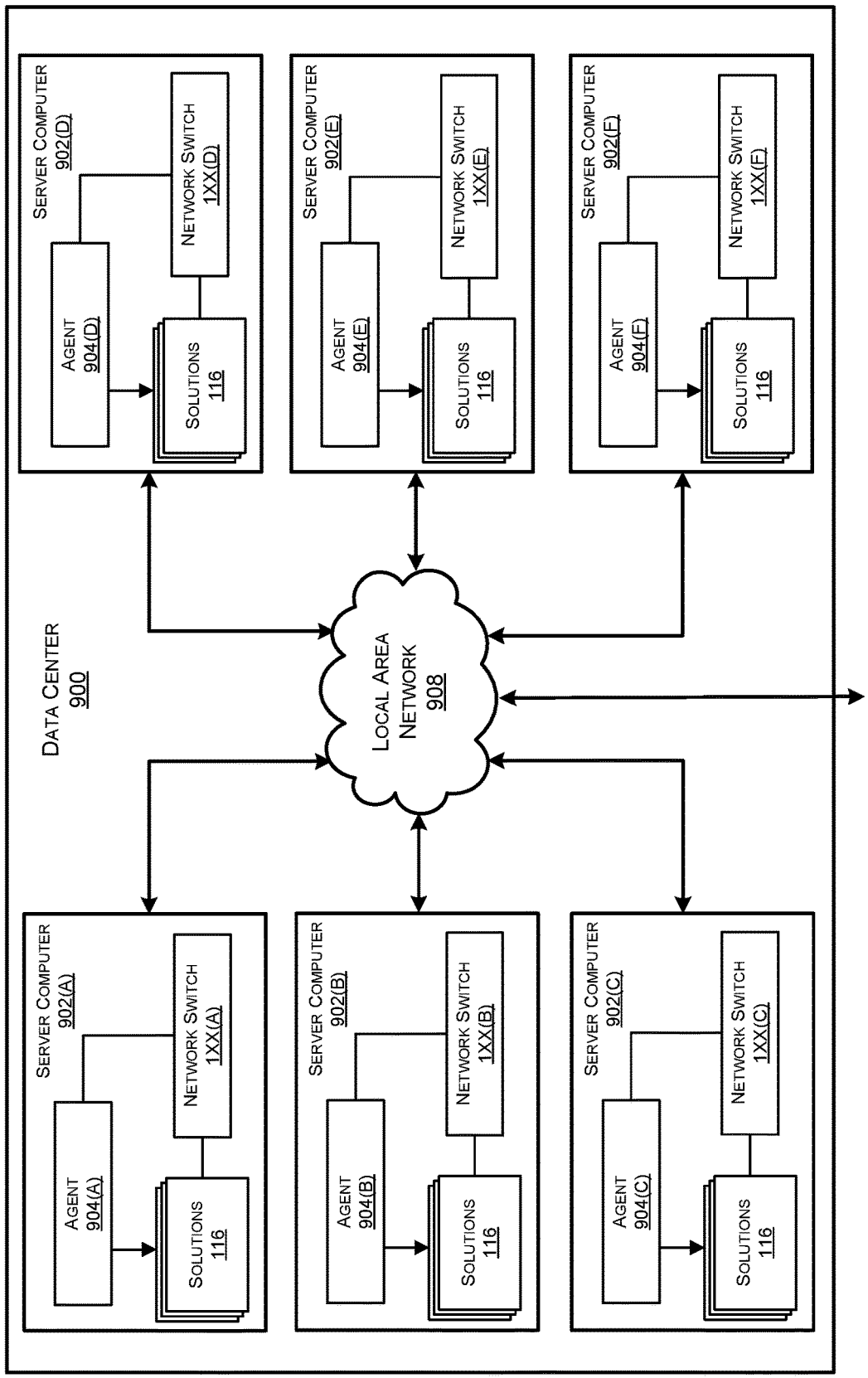
FIG. 9 illustrates a computing system diagram illustrating a configuration for a data center that can be utilized to implement aspects of the technologies disclosed herein.

FIG. 9 is a computing system diagram illustrating a configuration for a data center 900 that can be utilized to implement aspects of the technologies disclosed herein. The example data center 900 shown in FIG. 9 includes several server computers 902A-902E (which might be referred to herein singularly as "a server computer 902" or in the plural as "the server computers 902") for providing computing resources. In some examples, the server computers 902 may include, or correspond to, the servers described herein with respect to FIG. 1.

The server computers 902 can be standard tower, rack-mount, or blade server computers configured appropriately for providing the computing resources described herein. As mentioned above, the computing resources provided by the computing resource network 102 can be data processing resources such as VM instances or hardware computing systems, database clusters, computing clusters, storage clusters, data storage resources, database resources, networking resources, and others. Some of the servers 902 can also be configured to execute a resource manager capable of instantiating and/or managing the computing resources. In the case of VM instances, for example, the resource manager can be a hypervisor or another type of program configured to enable the execution of multiple VM instances on a single server computer 902. Server computers 902 in the data center 900 can also be configured to provide network services and other types of services.

In the example data center 900 shown in FIG. 9, an appropriate LAN 908 is also utilized to interconnect the server computers 902A-902E. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 600, between each of the server computers 902A-902E in each data center 900, and, potentially, between computing resources in each of the server computers 902. It should be appreciated that the configuration of the data center 900 described with reference to FIG. 9 is merely illustrative and that other implementations can be utilized.

In some examples, the server computers 902 may each execute one or more computing-based solutions 112, provisioned across a set or cluster of servers 902. The computing-based solutions 112 on each server computer 902 may support a single application or service, or multiple applications or services (for one or more users).

In some instances, the computing resource network 102 may provide computing resources, like application containers, VM instances, and storage, on a permanent or an as-needed basis. Among other types of functionality, the computing resources provided by the computing resource network 102 may be utilized to implement the various services described above. The computing resources provided by the computing resource network 102 can include various types of computing resources, such as data processing resources like application containers and VM instances, data storage resources, networking resources, data communication resources, network services, and the like.

Each type of computing resource provided by the computing resource network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The computing resources network 102 can also be configured to provide other types of computing resources not mentioned specifically herein.

The computing resources provided by the computing resource network 102 may be enabled in one embodiment by one or more data centers 900 (which might be referred to herein singularly as "a data center 900" or in the plural as "the data centers 900"). The data centers 900 are facilities utilized to house and operate computer systems and associated components. The data centers 900 typically include redundant and backup power, communications, cooling, and security systems. The data centers 900 can also be located in geographically disparate locations. One illustrative embodiment for a data center 900 that can be utilized to implement the technologies disclosed herein will be described below with regard to FIG. 9.

Figure 10:
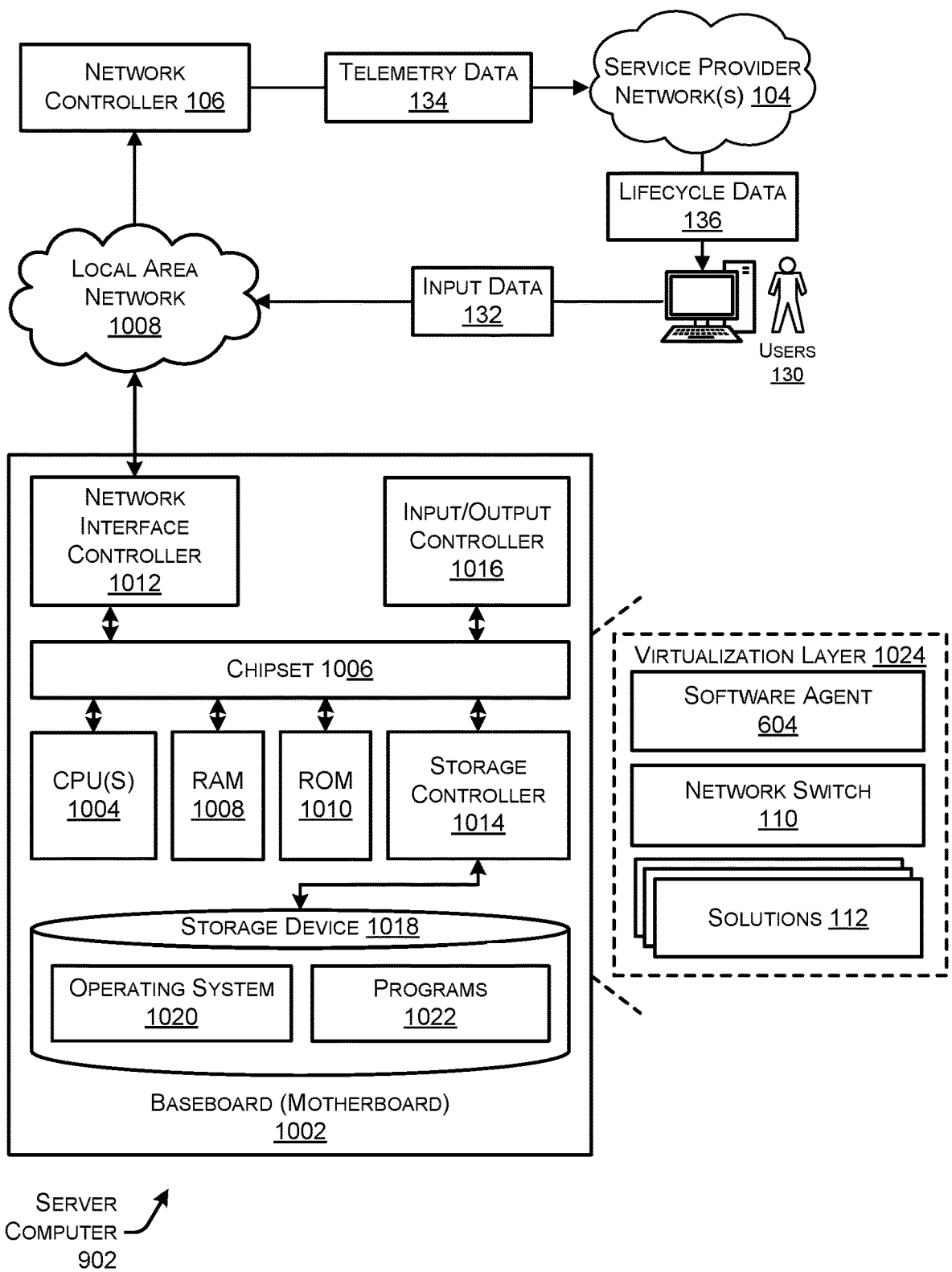
FIG. 10 is a computer architecture diagram showing an illustrative computer hardware architecture for implement-

FIG. 10 shows an example computer architecture for a server computer 902 capable of executing program components for implementing the functionality described above. The computer architecture shown in FIG. 10 illustrates a conventional server computer, workstation, desktop computer, laptop, tablet, network appliance, e-reader, smartphone, or other computing device, and can be utilized to execute any of the software components presented herein. The server computer 902 may, in some examples, correspond to a physical server described herein with respect to FIG. 1.

The computer 902 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 902.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 902. The chipset 1006 can further provide an interface to a computer-readable storage medium such as a read-only memory ("ROM") 1010 or non-volatile RAM ("NVRAM") for storing basic routines that help to startup the computer 902 and to transfer information between the various components and devices. The ROM 1010 or NVRAM can also store other software components necessary for the operation of the computer 902 in accordance with the configurations described herein.

The computer 1002 can operate in a networked environment using logical connections to remote computing devices and computer systems through a network, such as the network 908. The chipset 1006 can include functionality for providing network connectivity through a NIC 1012, such as a gigabit Ethernet adapter. The NIC 1012 is capable of connecting the computer 902 to other computing devices over the network 908 (or 118). It should be appreciated that multiple NICs 1012 can be present in the computer 902, connecting the computer to other types of networks and remote computer systems.

The computer 902 can be connected to a storage device 1018 that provides non-volatile storage for the computer. The storage device 1018 can store an operating system 1020, programs 1022, and data, which have been described in greater detail herein. The storage device 1018 can be connected to the computer 902 through a storage controller 1014 connected to the chipset 1006. The storage device 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 902 can store data on the storage device 1018 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1018 is characterized as primary or secondary storage, and the like.

For example, the computer 902 can store information to the storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 902 can further read information from the storage device 1018 by detecting the physical states or characteristics of one or more particular locations within the physical storage units.

In addition to the mass storage device 1018 described above, the computer 902 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 902. In some examples, the operations performed by the computing resource network 102, and or any components included therein, may be supported by one or more devices similar to computer 902. Stated otherwise, some or all of the operations performed by the computing resource network 102, and or any components included therein, may be performed by one or more computer devices 902 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1018 can store an operating system 1020 utilized to control the operation of the computer 902. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 1018 can store other system or application programs and data utilized by the computer 902.

In one embodiment, the storage device 1018 or other computer-readable storage media is encoded with computer-executable instructions which, when loaded into the computer 902, transform the computer from a general-purpose computing system into a special-purpose computer capable of implementing the embodiments described herein. These computer-executable instructions transform the computer 902 by specifying how the CPUs 1004 transition between states, as described above. According to one embodiment, the computer 902 has access to computer-readable storage media storing computer-executable instructions which, when executed by the computer 902, perform the various processes described above with regard to FIGS. 1-8. The computer 902 can also include computer-readable storage media having instructions stored thereupon for performing any of the other computer-implemented operations described herein.

The computer 902 can also include one or more input/output controllers 1016 for receiving and processing input from a number of input devices, such as a keyboard, a mouse, a touchpad, a touch screen, an electronic stylus, or other type of input device. Similarly, an input/output controller 1016 can provide output to a display, such as a computer monitor, a flat-panel display, a digital projector, a printer, or other type of output device. It will be appreciated that the computer 902 might not include all of the components shown in FIG. 10, can include other components that are not explicitly shown in FIG. 10, or might utilize an architecture completely different than that shown in FIG. 10.

The server computer 902 may support a virtualization layer 1024, such as one or more computing-based solutions 112 executing on the server computer 902. In some examples, the virtualization layer 1024 may be supported by a hypervisor that provides one or more virtual machines running on the server computer 902 to perform functions described herein. The virtualization layer 1024 may generally support a virtual resource that performs at least portions of the techniques described herein. The network switch 110 may support a software agent 604 executing thereon, the software agent 604 and/or network switch 110 may send and receive various data and provide it to components. For instance, the software agent 604 may collect telemetry data 134 indicative of usage of a computing based-solution 112, by the server computer(s) 902, and may send the telemetry data 134 to a network controller 106, which may transmit the telemetry data 134 over the network 1008 to a service provider network 104 where lifecycle data 136 is generated to present on a user portal displayed on a computing device associated with the user account.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
   one or more processors; and
   one or more non-transitory computer-readable media comprising instructions that, when executed by the one or more processors, cause the one or more processors to perform operations comprising:
   providing a computing-based solution to a user account associated with a service provider, the computing-based solution being deployed on one or more computing devices associated with the user account;
   collecting telemetry data indicative of usage of the computing-based solution by the one or more computing devices;
   using the telemetry data to determine a first stage, from a plurality of stages, of an experience lifecycle for the computing-based solution to which the user account has progressed;
   identifying an association between the first stage of the experience lifecycle and content that includes information for progressing to a second stage of the plurality of stages in the experience lifecycle; and providing the user account with access to indications of:
- the first stage to which the user account has progressed in the experience lifecycle for the computing-based solution; and
- the content that includes the information for progressing from the first stage to the second stage in the experience lifecycle.

2. The system of claim 1, the operations further comprising:
- collecting additional telemetry data indicative of usage of the computing-based solution by the one or more computing devices;
- using the additional telemetry data to determine that the user account has satisfied one or more metrics for progressing from the first stage to the second stage of the experience lifecycle;
- identifying an association between the second stage of the experience lifecycle and additional content that includes additional information for progressing from the second stage to a third stage of the plurality of stages in the experience lifecycle; and
- providing the user account with access to indications of:
  - the second stage to which the user account has progressed in the experience lifecycle for the computing-based solution; and
  - the additional content that includes the additional information for progressing from the second stage to the third stage in the experience lifecycle.

3. The system of claim 1, the operations further comprising:
- identifying an association between the first stage of the experience lifecycle and additional content that includes supplemental information for utilizing the content that includes the information for progressing to the second stage in the experience lifecycle; and
- providing the user account with access to indications of the additional content that includes the supplemental information for utilizing the content that includes the information for progressing from the first stage to the second stage in the experience lifecycle.

4. The system of claim 3, the operations further comprising:
- collecting additional telemetry data indicative of usage of the computing-based solution by the one or more computing devices;
- using the telemetry data and the additional telemetry data to determine an amount of time since the user account has progressed to the first stage;
- determining that the amount of time satisfies a threshold amount of time; and
- wherein identifying the association between the first stage of the experience lifecycle and the additional content is based at least in part on the determining that the amount of time since the user has progressed to the first stage satisfies the threshold amount of time.

5. The system of claim 1, the operations further comprising:
- using the telemetry data to determine a first substage, from a plurality of substages in the first stage, of the first stage of the experience lifecycle;
- identifying an association between the first substage of the first stage and additional content that includes supplemental information for progressing to a second substage of the plurality of substages in the first stage; and
- providing the user account with access to indications of:
  - the first substage to which the user account has progressed in the first stage; and
  - the additional content that includes the supplemental information for progressing from the first substage to the second substage in the first stage.

6. The system of claim 5, the operations further comprising providing the user account with access to indications of:
- an overall completion metric associated with the experience lifecycle for the computing-based solution, the overall completion metric based at least in part on a stage to which the user account has progressed in the experience lifecycle; and a
- stage completion metric associated with the stage to which the user account has progressed, the stage completion metric based at least in part on a substage to which the user account has progressed in the stage.

7. The system of claim 1, wherein the content that includes the information for progressing from the first stage in the experience lifecycle includes at least one of webinars, links to guides associated with the computing-based solution, video content associated with the computing-based solution, or interactive content associated with the computing-based solution.

8. A computer-implemented method comprising:
- Providing, by a processor, a computing-based solution to a user account associated with a service provider, the computing-based solution being deployed on one or more computing devices associated with the user account;
- collecting, by the processor, telemetry data indicative of usage of the computing-based solution by the one or more computing devices;
- using, by the processor, the telemetry data to determine a first stage, from a plurality of stages, of an experience lifecycle for the computing-based solution to which the user account has progressed;
- identifying, by the processor using the telemetry data, information for progressing to a second stage of the plurality of stages in the experience lifecycle;
- identifying, by the processor, an association between the first stage of the experience lifecycle and content to include in one or more user interfaces (UIs) for display on a computing device associated with the user account, the content including the information;
- sending, by the processor, UI data representing the one or more UIs to the computing device, the one or more UIs comprising:
  - a first portion in which a description of the computing-based solution is presented; and
  - a second portion in which a completion metric is presented, the completion metric indicating the first stage of the stages in the experience lifecycle.

9. The computer-implemented method of claim 8, further comprising a third portion in which an indication of supplemental content is presented, the supplemental content comprising supplemental information for progressing from the first stage to the second stage in the experience lifecycle.

10. The computer-implemented method of claim 8, further comprising:
- collecting, by the processor, additional telemetry data indicative of usage of the computing-based solution by the one or more computing devices;
- using, by the processor, the additional telemetry data to determine that the user account has satisfied the completion metric for progressing from the first stage to the second stage of the experience lifecycle;

identifying, by the processor, using the additional telemetry data, additional information for progressing to a third stage of the plurality of stages in the experience lifecycle;
identifying, by the processor, an association between the third stage of the experience lifecycle and additional content to include in the one or more UIs, the additional content including the additional information; and
sending, by the processor, additional UI data representing the one or more UIs to the computing device, the one or more UIs comprising:
the first portion in which a description of the computing-based solution is presented;
the second portion in which a completion metric is presented, the completion metric indicating the second stage in the experience lifecycle; and
a third portion in which an indication of supplemental content is presented, the supplemental content comprising supplemental information for progressing from the second stage to the third stage in the experience lifecycle.

11. The computer-implemented method of claim 8, wherein the telemetry data further indicates the progression of the user account through substages of the first stage of the experience lifecycle for the computing-based solution.

12. The computer-implemented method of claim 11, wherein the one or more UIs further comprise a third portion in which an indication of supplemental content is presented, the supplement content comprising:
first supplemental information for progressing from the first stage to the second stage in the experience lifecycle; and
second supplemental information for progressing from a first substage to a second substage of the first stage in the experience lifecycle.

13. The computer-implemented method of claim 11, wherein the one or more UIs further comprise a third portion in which a substage completion metric is presented, the substage completion metric indicating a first substage to which the user account has progressed in the substages of the first stage of the experience lifecycle.

14. A computer-implemented method comprising:
Providing, by a processor, a computing-based solution to a user account associated with a service provider, the computing-based solution being deployed on one or more computing devices associated with the user account;
collecting, by the processor, telemetry data indicative of usage of the computing-based solution by the one or more computing devices;
using, by the processor, the telemetry data to determine a first stage, from a plurality of stages, of an experience lifecycle for the computing-based solution to which the user account has progressed;
identifying, by the processor, an association between the first stage of the experience lifecycle and content that includes information for progressing to a second stage of the plurality of stages in the experience lifecycle; and
providing, by the processor, the user account with access to indications of:
the first stage to which the user account has progressed in the experience lifecycle for the computing-based solution; and
the content that includes the information for progressing from the first stage to the second stage in the experience lifecycle.

15. The computer-implemented method of claim 14, further comprising:
collecting, by the processor, additional telemetry data indicative of usage of the computing-based solution by the one or more computing devices;
using, by the processor, the additional telemetry data to determine that the user account has satisfied one or more metrics for progressing from the first stage to the second stage of the experience lifecycle;
identifying, by the processor, an association between the second stage of the experience lifecycle and additional content that includes additional information for progressing from the second stage to a third stage of the plurality of stages in the experience lifecycle; and
providing, by the processor, the user account with access to indications of:
the second stage to which the user account has progressed in the experience lifecycle for the computing-based solution; and
the additional content that includes the additional information for progressing from the second stage to the third stage in the experience lifecycle.

16. The computer-implemented method of claim 14, further comprising:
identifying, by the processor, an association between the first stage of the experience lifecycle and additional content that includes supplemental information for utilizing the content that includes the information for progressing to the second stage in the experience lifecycle; and
providing, by the processor, the user account with access to indications of the additional content that includes the supplemental information for utilizing the content that includes the information for progressing from the first stage to the second stage in the experience lifecycle.

17. The computer-implemented method of claim 16, further comprising:
collecting, by the processor, additional telemetry data indicative of usage of the computing-based solution by the one or more computing devices;
using, by the processor, the telemetry data and the additional telemetry data to determine an amount of time since the user account has progressed to the first stage;
determining, by the processor, that the amount of time satisfies a threshold amount of time; and
wherein identifying the association between the first stage of the experience lifecycle and the additional content is based at least in part on the determining that the amount of time since the user has progressed to the first stage satisfies the threshold amount of time.

18. The computer-implemented method of claim 14, further comprising:
using, by the processor, the telemetry data to determine a first substage, from a plurality of substages in the first stage, of the first stage of the experience lifecycle;
identifying, by the processor, an association between the first substage of the first stage and additional content that includes supplemental information for progressing to a second substage of the plurality of substages in the first stage; and
providing, by the processor, the user account with access to indications of:
the first substage to which the user account has progressed in the first stage; and
the additional content that includes the supplemental information for progressing from the first substage to the second substage in the first stage.

19. The computer-implemented method of claim 18, further comprising providing the user account with access to indications of:
- an overall completion metric associated with the experience lifecycle for the computing-based solution, the overall completion metric based at least in part on a stage to which the user account has progressed in the experience lifecycle; and
- a stage completion metric associated with the stage to which the user account has progressed, the stage completion metric based at least in part on a substage to which the user account has progressed in the stage.

20. The computer-implemented method of claim 14, wherein the content that includes the information for progressing from the first stage in the experience lifecycle includes at least one of webinars, links to guides associated with the computing-based solution, video content associated with the computing-based solution, or interactive content associated with the computing-based solution.

\* \* \* \* \*